(12) United States Patent
Grossman et al.

(10) Patent No.: US 8,505,813 B2
(45) Date of Patent: Aug. 13, 2013

(54) CUSTOMER BENEFIT OFFER PROGRAM ENROLLMENT

(75) Inventors: Glenn M. Grossman, Matthews, NC (US); Joseph A. Giordano, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 271 days.

(21) Appl. No.: 12/554,615

(22) Filed: Sep. 4, 2009

(65) Prior Publication Data

US 2011/0057027 A1    Mar. 10, 2011

(51) Int. Cl.
*G07F 19/00* (2006.01)
(52) U.S. Cl.
USPC ........... 235/379; 235/375; 705/14.31; 705/67
(58) Field of Classification Search
USPC ......................... 235/379, 375; 705/14.31, 67
See application file for complete search history.

(56) References Cited

U.S. PATENT DOCUMENTS

| | | |
|---|---|---|
| 5,041,851 A | 8/1991 | Nelson |
| 5,176,224 A | 1/1993 | Spector |
| 5,192,854 A | 3/1993 | Counts |
| 5,201,010 A | 4/1993 | Deaton et al. |
| 5,202,826 A | 4/1993 | McCarthy |
| 5,227,874 A | 7/1993 | Von Kohorn |
| 5,239,165 A | 8/1993 | Novak |
| 5,245,533 A | 9/1993 | Marshall |
| 5,250,789 A | 10/1993 | Johnsen |
| 5,256,863 A | 10/1993 | Ferguson et al. |
| 5,265,008 A | 11/1993 | Benton et al. |
| 5,283,734 A | 2/1994 | Von Kohorn |
| 5,285,278 A | 2/1994 | Holman |
| 5,287,181 A | 2/1994 | Holman |
| 5,305,196 A | 4/1994 | Deaton et al. |
| 5,353,218 A | 10/1994 | De Lapa et al. |
| 5,368,129 A | 11/1994 | Von Kohorn |
| 5,373,440 A | 12/1994 | Cohen et al. |
| 5,388,165 A | 2/1995 | Deaton et al. |
| 5,398,326 A | 3/1995 | Lee |
| 5,398,932 A | 3/1995 | Eberhardt et al. |
| 5,417,424 A | 5/1995 | Snowden et al. |
| 5,420,606 A | 5/1995 | Begum et al. |
| 5,430,644 A | 7/1995 | Deaton et al. |
| 5,448,471 A | 9/1995 | Deaton et al. |
| 5,470,079 A | 11/1995 | Lestrange et al. |

(Continued)

OTHER PUBLICATIONS

"Card Linked Offers (CLOs)—Loyalty 2.0" (http://clovrmedia.com/financial-institutions/), Clovr Media Inc., Boston, MA, 2010.

(Continued)

*Primary Examiner* — Allyson Trail
(74) *Attorney, Agent, or Firm* — Weiss & Arons LLP; Michael Springs

(57) ABSTRACT

Apparatus and methods for providing customer benefit offer program enrollment are provided. A system for enrolling a purchasing instrument in an electronic customer benefit offer program an electromagnetic receiver module. The receiver module may be configured to receive data from the purchasing instrument and receive from a customer a customer selection of a notification channel, the channel to be used for notifying the customer about a customer benefit. The system may also include a processor module configured to associate the purchasing instrument data with an account on an electronic platform so that a customer benefit offer that is stored on the platform may be associated with the purchasing instrument.

17 Claims, 21 Drawing Sheets

(56) References Cited

U.S. PATENT DOCUMENTS

| | | |
|---|---|---|
| 5,471,669 A | 11/1995 | Lidman |
| 5,484,998 A | 1/1996 | Bejnar et al. |
| 5,491,326 A | 2/1996 | Marceau et al. |
| 5,492,370 A | 2/1996 | Chatwin et al. |
| 5,497,314 A | 3/1996 | Novak |
| 5,501,491 A | 3/1996 | Thompson |
| 5,508,731 A | 4/1996 | Kohorn |
| 5,517,015 A | 5/1996 | Curry et al. |
| 5,523,794 A | 6/1996 | Mankovitz et al. |
| 5,537,314 A | 7/1996 | Kanter |
| 5,539,450 A | 7/1996 | Handelman |
| 5,557,516 A | 9/1996 | Hogan |
| 5,570,465 A | 10/1996 | Tsakanikas |
| 5,588,649 A | 12/1996 | Blumberg et al. |
| 5,592,212 A | 1/1997 | Handelman |
| 5,592,376 A | 1/1997 | Hodroff |
| 5,592,560 A | 1/1997 | Deaton et al. |
| 5,603,078 A | 2/1997 | Henderson et al. |
| 5,612,527 A | 3/1997 | Ovadia |
| 5,612,868 A | 3/1997 | Off et al. |
| 5,613,012 A | 3/1997 | Hoffman et al. |
| 5,619,066 A | 4/1997 | Curry et al. |
| 5,620,079 A | 4/1997 | Molbak |
| 5,621,812 A | 4/1997 | Deaton et al. |
| 5,638,457 A | 6/1997 | Deaton et al. |
| 5,644,723 A | 7/1997 | Deaton et al. |
| 5,649,114 A | 7/1997 | Deaton et al. |
| 5,650,604 A | 7/1997 | Marcous et al. |
| 5,659,469 A | 8/1997 | Deaton et al. |
| 5,659,740 A | 8/1997 | Ezaki et al. |
| 5,675,662 A | 10/1997 | Deaton et al. |
| 5,687,322 A | 11/1997 | Deaton et al. |
| 5,689,100 A | 11/1997 | Carrithers et al. |
| 5,703,795 A | 12/1997 | Mankovitz |
| 5,708,782 A | 1/1998 | Larson et al. |
| 5,710,886 A | 1/1998 | Christensen et al. |
| 5,715,448 A | 2/1998 | Suzuki et al. |
| 5,731,980 A | 3/1998 | Dolan et al. |
| 5,732,398 A | 3/1998 | Tagawa |
| 5,734,838 A | 3/1998 | Robinson et al. |
| 5,736,721 A | 4/1998 | Swartz |
| 5,745,555 A | 4/1998 | Mark |
| 5,759,101 A | 6/1998 | Von Kohorn |
| 5,767,896 A | 6/1998 | Nemirofsky |
| 5,789,732 A | 8/1998 | Mcmahon et al. |
| 5,791,991 A | 8/1998 | Small |
| 5,799,767 A | 9/1998 | Molbak |
| 5,805,719 A | 9/1998 | Pare et al. |
| 5,806,044 A | 9/1998 | Powell |
| 5,819,239 A | 10/1998 | Berson et al. |
| 5,821,512 A | 10/1998 | O'Hagan et al. |
| 5,822,735 A | 10/1998 | De Lapa et al. |
| 5,822,744 A | 10/1998 | Kesel |
| 5,832,457 A | 11/1998 | O'Brien et al. |
| 5,832,458 A | 11/1998 | Jones |
| 5,838,812 A | 11/1998 | Pare et al. |
| 5,841,870 A | 11/1998 | Fieres et al. |
| 5,845,259 A | 12/1998 | West et al. |
| 5,845,265 A | 12/1998 | Woolston |
| 5,852,813 A | 12/1998 | Guenther et al. |
| 5,855,369 A | 1/1999 | Lieberman |
| 5,855,514 A | 1/1999 | Kamille |
| 5,857,175 A | 1/1999 | Day et al. |
| 5,859,414 A | 1/1999 | Grimes et al. |
| 5,865,470 A | 2/1999 | Thompson |
| 5,870,723 A | 2/1999 | Pare et al. |
| 5,873,069 A | 2/1999 | Reuhl et al. |
| 5,880,449 A | 3/1999 | Teicher et al. |
| 5,884,278 A | 3/1999 | Powell |
| 5,887,271 A | 3/1999 | Powell |
| 5,892,827 A | 4/1999 | Beach et al. |
| 5,895,902 A | 4/1999 | Ziarno |
| 5,905,246 A | 5/1999 | Fajkowski |
| 5,907,350 A | 5/1999 | Nemirofsky |
| 5,916,024 A | 6/1999 | Von Kohorn |
| 5,917,168 A | 6/1999 | Nakamura et al. |
| 5,918,213 A | 6/1999 | Bernard et al. |
| 5,923,016 A | 7/1999 | Fredregill et al. |
| 5,924,080 A | 7/1999 | Johnson |
| 5,926,795 A | 7/1999 | Williams |
| 5,926,796 A | 7/1999 | Walker et al. |
| 5,931,467 A | 8/1999 | Kamille |
| 5,943,424 A | 8/1999 | Berger et al. |
| 5,948,040 A | 9/1999 | Delorme et al. |
| 5,950,173 A | 9/1999 | Perkowski |
| 5,953,047 A | 9/1999 | Nemirofsky |
| 5,953,705 A | 9/1999 | Oneda |
| 5,956,695 A | 9/1999 | Carrithers et al. |
| 5,967,844 A | 10/1999 | Doutrich et al. |
| 5,970,469 A | 10/1999 | Scroggie et al. |
| 5,970,470 A | 10/1999 | Walker et al. |
| 5,974,396 A | 10/1999 | Anderson et al. |
| 5,978,013 A | 11/1999 | Jones et al. |
| 5,979,757 A | 11/1999 | Tracy et al. |
| 5,988,346 A | 11/1999 | Tedesco et al. |
| 5,992,570 A | 11/1999 | Walter et al. |
| 5,992,888 A | 11/1999 | North et al. |
| 6,000,608 A | 12/1999 | Dorf |
| 6,009,411 A | 12/1999 | Kepecs |
| 6,012,038 A | 1/2000 | Powell |
| 6,012,039 A | 1/2000 | Hoffman et al. |
| 6,014,634 A | 1/2000 | Scroggie et al. |
| 6,016,255 A | 1/2000 | Bolan et al. |
| 6,021,362 A | 2/2000 | Maggard et al. |
| 6,023,688 A | 2/2000 | Ramachandran et al. |
| 6,024,288 A | 2/2000 | Gottlich et al. |
| 6,026,387 A | 2/2000 | Kesel |
| 6,028,920 A | 2/2000 | Carson |
| 6,032,127 A | 2/2000 | Schkolnick et al. |
| 6,035,280 A | 3/2000 | Christensen |
| 6,038,549 A | 3/2000 | Davis et al. |
| 6,039,244 A | 3/2000 | Finsterwald |
| 6,048,271 A | 4/2000 | Barcelou |
| 6,055,513 A | 4/2000 | Katz et al. |
| 6,076,068 A | 6/2000 | DeLapa et al. |
| 6,105,013 A | 8/2000 | Curry et al. |
| 6,110,041 A | 8/2000 | Walker et al. |
| 6,116,402 A | 9/2000 | Beach et al. |
| 6,116,505 A | 9/2000 | Withrow |
| 6,125,349 A | 9/2000 | Maher |
| 6,129,346 A | 10/2000 | Zorn |
| 6,138,105 A | 10/2000 | Walker et al. |
| 6,138,911 A | 10/2000 | Fredregill et al. |
| 6,161,059 A | 12/2000 | Tedesco et al. |
| 6,185,545 B1 | 2/2001 | Resnick et al. |
| 6,189,787 B1 | 2/2001 | Dorf |
| 6,199,753 B1 | 3/2001 | Tracy et al. |
| 6,230,143 B1 | 5/2001 | Simons et al. |
| 6,233,564 B1 | 5/2001 | Schulze, Jr. |
| 6,237,145 B1 | 5/2001 | Narasimhan et al. |
| 6,251,017 B1 | 6/2001 | Leason et al. |
| 6,266,647 B1 | 7/2001 | Fernandez |
| 6,276,724 B1 | 8/2001 | Zorn |
| 6,292,785 B1 | 9/2001 | Mcevoy et al. |
| 6,292,786 B1 | 9/2001 | Deaton et al. |
| 6,306,035 B1 | 10/2001 | Kelly et al. |
| 6,308,893 B1 | 10/2001 | Waxelbaum et al. |
| 6,311,896 B1 | 11/2001 | Mulla et al. |
| 6,314,519 B1 | 11/2001 | Davis et al. |
| 6,321,208 B1 | 11/2001 | Barnett et al. |
| 6,327,594 B1 | 12/2001 | Van Huben et al. |
| 6,330,543 B1 | 12/2001 | Kepecs |
| 6,332,128 B1 | 12/2001 | Nicholson |
| 6,334,108 B1 | 12/2001 | Deaton et al. |
| 6,336,099 B1 | 1/2002 | Barnett et al. |
| 6,351,735 B1 | 2/2002 | Deaton et al. |
| 6,356,877 B1 | 3/2002 | Schulden et al. |
| 6,363,351 B1 | 3/2002 | Moro |
| 6,366,682 B1 | 4/2002 | Hoffman et al. |
| 6,377,935 B1 | 4/2002 | Deaton et al. |
| 6,386,323 B1 | 5/2002 | Ramachandran et al. |
| 6,394,341 B1 | 5/2002 | Makipaa et al. |
| 6,394,907 B1 | 5/2002 | Rowe |
| 6,397,198 B1 | 5/2002 | Hoffman et al. |

| Patent Number | Date | Inventor(s) |
|---|---|---|
| 6,402,030 B1 | 6/2002 | Summers et al. |
| 6,408,286 B1 | 6/2002 | Heiden |
| 6,424,949 B1 | 7/2002 | Deaton et al. |
| 6,466,921 B1 | 10/2002 | Cordery et al. |
| 6,467,684 B2 | 10/2002 | Fite et al. |
| 6,467,686 B1 | 10/2002 | Guthrie et al. |
| 6,493,110 B1 | 12/2002 | Roberts |
| 6,493,724 B1 | 12/2002 | Cusack et al. |
| 6,496,804 B2 | 12/2002 | Mcevoy et al. |
| 6,497,360 B1 | 12/2002 | Schulze, Jr. |
| 6,508,398 B1 | 1/2003 | Estes |
| 6,722,473 B1 | 4/2004 | Ramachandran et al. |
| 6,748,365 B1 | 6/2004 | Quinlan et al. |
| 6,749,240 B1 | 6/2004 | Burr et al. |
| 6,758,393 B1 | 7/2004 | Luciano et al. |
| 6,766,301 B1 | 7/2004 | Daniel et al. |
| 6,769,010 B1 | 7/2004 | Knapp et al. |
| 6,778,967 B1 | 8/2004 | Nicholson |
| 6,779,722 B1 | 8/2004 | Mason |
| 6,795,707 B2 | 9/2004 | Martin et al. |
| 6,810,385 B1 | 10/2004 | Brady et al. |
| 6,829,596 B1 | 12/2004 | Frazee |
| 6,837,436 B2 | 1/2005 | Swartz et al. |
| 6,850,901 B1 | 2/2005 | Sykes et al. |
| 6,852,031 B1 | 2/2005 | Rowe |
| 6,862,575 B1 | 3/2005 | Anttila et al. |
| 6,868,406 B1 | 3/2005 | Ogg et al. |
| 6,876,978 B1 | 4/2005 | Walker et al. |
| 6,882,442 B2 | 4/2005 | Roberts |
| 6,885,994 B1 | 4/2005 | Scroggie et al. |
| 6,886,748 B1 | 5/2005 | Moore |
| 6,892,180 B1 | 5/2005 | Pointeau et al. |
| 6,901,374 B1 | 5/2005 | Himes |
| 6,901,436 B1 | 5/2005 | Schneider |
| 6,915,271 B1 | 7/2005 | Meyer et al. |
| 6,925,441 B1 | 8/2005 | Jones, III et al. |
| 6,932,270 B1 | 8/2005 | Fajkowski |
| 6,937,995 B1 | 8/2005 | Kepecs |
| 6,954,732 B1 | 10/2005 | Delapa et al. |
| 6,957,186 B1 | 10/2005 | Guheen et al. |
| 6,959,286 B2 | 10/2005 | Perkowski |
| 6,961,712 B1 | 11/2005 | Perkowski |
| 6,961,713 B2 | 11/2005 | Perkowski |
| 6,965,872 B1 | 11/2005 | Grdina |
| 6,969,318 B1 | 11/2005 | Packes et al. |
| 6,970,852 B1 | 11/2005 | Sendo et al. |
| 6,975,937 B1 | 12/2005 | Kantarjiev et al. |
| 6,978,380 B1 | 12/2005 | Husain et al. |
| 6,980,670 B1 | 12/2005 | Hoffman et al. |
| 6,985,452 B2 | 1/2006 | Marshall et al. |
| 6,985,608 B2 | 1/2006 | Hoffman et al. |
| 6,993,498 B1 | 1/2006 | Deaton et al. |
| 6,999,943 B1 | 2/2006 | Johnson et al. |
| 7,003,495 B1 | 2/2006 | Burger et al. |
| 7,003,500 B1 | 2/2006 | Driessen |
| 7,006,983 B1 | 2/2006 | Packes et al. |
| 7,010,498 B1 | 3/2006 | Berstis |
| 7,013,286 B1 | 3/2006 | Aggarwal et al. |
| 7,016,860 B2 | 3/2006 | Modani et al. |
| 7,016,862 B1 | 3/2006 | Vassigh et al. |
| 7,024,374 B1 | 4/2006 | Day et al. |
| 7,031,945 B1 | 4/2006 | Donner |
| 7,043,441 B1 | 5/2006 | Maher |
| 7,047,205 B2 | 5/2006 | Hale et al. |
| 7,052,393 B1 | 5/2006 | Schoen |
| 7,054,830 B1 | 5/2006 | Eggleston et al. |
| 7,054,837 B2 | 5/2006 | Hoffman et al. |
| 7,058,596 B1 | 6/2006 | Wojcik et al. |
| 7,063,263 B2 | 6/2006 | Swartz et al. |
| 7,065,559 B1 | 6/2006 | Weiss |
| 7,068,382 B1 | 6/2006 | Silverbrook et al. |
| 7,089,199 B2 | 8/2006 | Perkowski |
| 7,089,322 B1 | 8/2006 | Stallmann |
| 7,107,221 B1 | 9/2006 | Tracy et al. |
| 7,107,231 B1 | 9/2006 | Hall et al. |
| 7,117,183 B2 | 10/2006 | Blair et al. |
| 7,120,596 B2 | 10/2006 | Hoffman et al. |
| 7,120,607 B2 | 10/2006 | Bolle et al. |
| 7,124,101 B1 | 10/2006 | Mikurak |
| 7,127,236 B2 | 10/2006 | Khan et al. |
| 7,130,807 B1 | 10/2006 | Mikurak |
| 7,143,055 B1 | 11/2006 | Perkowski |
| 7,150,028 B1 | 12/2006 | Ranta |
| 7,152,040 B1 | 12/2006 | Hawthorne et al. |
| 7,162,454 B1 | 1/2007 | Donner et al. |
| 7,165,041 B1 | 1/2007 | Guheen et al. |
| 7,168,617 B2 | 1/2007 | Walker et al. |
| 7,178,720 B1 | 2/2007 | Strubbe et al. |
| 7,185,809 B2 | 3/2007 | Barton et al. |
| 7,188,138 B1 | 3/2007 | Schneider |
| 7,203,665 B2 | 4/2007 | Donner |
| 7,216,109 B1 | 5/2007 | Donner |
| 7,216,110 B1 | 5/2007 | Ogg et al. |
| 7,231,357 B1 | 6/2007 | Shanman et al. |
| 7,233,913 B2 | 6/2007 | Scroggie et al. |
| 7,236,956 B1 | 6/2007 | Ogg et al. |
| 7,240,023 B1 | 7/2007 | Powell |
| 7,240,037 B1 | 7/2007 | Bussell |
| 7,246,158 B2 | 7/2007 | Kitada et al. |
| 7,248,719 B2 | 7/2007 | Hoffman et al. |
| 7,249,096 B1 | 7/2007 | Lasater et al. |
| 7,257,545 B1 | 8/2007 | Hung |
| 7,263,507 B1 | 8/2007 | Brake, Jr. et al. |
| 7,267,614 B1 | 9/2007 | Jorasch et al. |
| 7,277,866 B1 | 10/2007 | Or-Bach et al. |
| 7,280,975 B1 | 10/2007 | Donner |
| 7,280,979 B1 | 10/2007 | Katz et al. |
| 7,283,650 B1 | 10/2007 | Sharma et al. |
| 7,283,974 B2 | 10/2007 | Katz et al. |
| 7,292,999 B2 | 11/2007 | Hobson et al. |
| 7,296,282 B1 | 11/2007 | Koplar et al. |
| 7,306,141 B1 | 12/2007 | Schwarz, Jr. |
| 7,308,254 B1 | 12/2007 | Rissanen |
| 7,311,244 B1 | 12/2007 | Schwarz, Jr. |
| 7,315,826 B1 | 1/2008 | Guheen et al. |
| 7,318,041 B2 | 1/2008 | Walker et al. |
| 7,319,987 B1 | 1/2008 | Hoffman et al. |
| 7,330,974 B1 | 2/2008 | Silverbrook et al. |
| 7,334,728 B2 | 2/2008 | Williams |
| 7,340,439 B2 | 3/2008 | Burger et al. |
| 7,343,350 B1 | 3/2008 | Donner |
| 7,349,668 B2 | 3/2008 | Ilan et al. |
| 7,357,311 B2 | 4/2008 | Silverbrook et al. |
| 7,357,312 B2 | 4/2008 | Gangi |
| 7,364,068 B1 | 4/2008 | Strubbe et al. |
| 7,364,086 B2 | 4/2008 | Mesaros |
| 7,367,500 B2 | 5/2008 | Fajkowski |
| 7,376,580 B1 | 5/2008 | Walker et al. |
| 7,377,421 B2 | 5/2008 | Rhoads |
| 7,379,891 B1 | 5/2008 | Donner et al. |
| 7,380,709 B2 | 6/2008 | Silverbrook et al. |
| 7,386,485 B1 | 6/2008 | Mussman et al. |
| 7,386,517 B1 | 6/2008 | Donner |
| 7,396,281 B2 | 7/2008 | Mendelsohn et al. |
| 7,398,225 B2 | 7/2008 | Voltmer et al. |
| 7,400,932 B2 | 7/2008 | Ackley et al. |
| 7,403,796 B2 | 7/2008 | Silverbrook et al. |
| 7,406,436 B1 | 7/2008 | Reisman |
| 7,407,092 B2 | 8/2008 | Silverbrook et al. |
| 7,412,409 B2 | 8/2008 | Aliabadi et al. |
| 7,415,424 B1 | 8/2008 | Donner |
| 7,415,443 B2 | 8/2008 | Hobson et al. |
| 7,428,498 B2 | 9/2008 | Voltmer et al. |
| 7,428,986 B2 | 9/2008 | Silverbrook et al. |
| 7,438,215 B2 | 10/2008 | Silverbrook et al. |
| 7,441,697 B2 | 10/2008 | Fletcher |
| 7,441,710 B2 | 10/2008 | Perkowski |
| 7,441,712 B2 | 10/2008 | Silverbrook et al. |
| 7,448,538 B2 | 11/2008 | Fletcher |
| 7,455,586 B2 | 11/2008 | Nguyen et al. |
| 7,464,050 B1 | 12/2008 | Deaton et al. |
| 7,469,829 B2 | 12/2008 | Silverbrook et al. |
| 7,472,827 B2 | 1/2009 | Fletcher |
| 7,490,065 B1 | 2/2009 | Ogg et al. |
| 7,496,524 B2 | 2/2009 | Voltmer et al. |
| 7,496,527 B2 | 2/2009 | Silverstein et al. |
| 7,506,168 B2 | 3/2009 | Silverbrook et al. |
| 7,515,914 B2 | 4/2009 | Herrod et al. |

| | | |
|---|---|---|
| 7,516,886 B2 | 4/2009 | Gangi |
| 7,529,713 B1 | 5/2009 | Donner |
| 7,533,810 B2 | 5/2009 | Walker et al. |
| 7,534,169 B2 | 5/2009 | Amaitis et al. |
| 7,536,034 B2 | 5/2009 | Rhoads et al. |
| 7,537,153 B2 | 5/2009 | Hurwitz et al. |
| 7,540,408 B2 | 6/2009 | Levine et al. |
| 7,546,257 B2 | 6/2009 | Hoffman et al. |
| 7,562,028 B1 | 7/2009 | Donner |
| 7,562,051 B1 | 7/2009 | Donner |
| 7,565,328 B1 | 7/2009 | Donner |
| 7,567,940 B1 | 7/2009 | Engelberg et al. |
| 7,575,172 B2 | 8/2009 | Silverbrook et al. |
| 7,577,575 B1 | 8/2009 | Donner et al. |
| 7,577,619 B1 | 8/2009 | Donner et al. |
| 7,577,620 B2 | 8/2009 | Donner |
| 7,580,856 B1 | 8/2009 | Pliha |
| 7,584,133 B2 | 9/2009 | Horowitz |
| 7,584,134 B2 | 9/2009 | Horowitz |
| 7,584,139 B2 | 9/2009 | Goodwin |
| 7,590,589 B2 | 9/2009 | Hoffberg |
| 7,591,724 B2 | 9/2009 | Baerlocher |
| 7,593,871 B1 | 9/2009 | Mesaros |
| 7,593,883 B2 | 9/2009 | Horowitz |
| 7,597,250 B2 | 10/2009 | Finn |
| 7,599,857 B2 | 10/2009 | Bishop et al. |
| 7,606,730 B2 | 10/2009 | Antonucci |
| 7,606,741 B2 | 10/2009 | King et al. |
| 7,613,628 B2 | 11/2009 | Ariff et al. |
| 7,617,159 B1 | 11/2009 | Donner |
| 7,620,475 B1 | 11/2009 | Bottazzi et al. |
| 7,621,442 B2 | 11/2009 | Silverbrook et al. |
| 7,627,499 B2 | 12/2009 | Hahn-Carlson |
| 7,637,810 B2 | 12/2009 | Amaitis |
| 7,646,503 B2 | 1/2010 | Silverbrook |
| 7,658,327 B2 | 2/2010 | Tuchman |
| 7,658,674 B2 | 2/2010 | Walker |
| 7,660,581 B2 | 2/2010 | Ramer |
| 7,663,789 B2 | 2/2010 | Silverbrook |
| 7,673,315 B1 | 3/2010 | Wong |
| 7,677,445 B2 | 3/2010 | Silverbrook |
| 7,681,800 B2 | 3/2010 | Silverbrook |
| 7,685,083 B2 | 3/2010 | Fairweather |
| 7,689,302 B2 | 3/2010 | Schlottmann |
| 7,689,473 B2 | 3/2010 | Borom |
| 7,693,766 B2 | 4/2010 | Horowitz |
| 7,702,318 B2 | 4/2010 | Ramer |
| 7,702,918 B2 | 4/2010 | Tattan |
| 7,706,838 B2 | 4/2010 | Atsmon |
| 7,711,598 B2 | 5/2010 | Perkowski |
| 7,716,077 B1 | 5/2010 | Mikurak |
| 7,716,080 B2 | 5/2010 | Postrel |
| 7,720,718 B2 | 5/2010 | Hale |
| 7,729,925 B2 | 6/2010 | Maritzen |
| 7,729,945 B1 | 6/2010 | Katz |
| 7,735,726 B2 | 6/2010 | Bjoraker |
| 7,739,162 B2 | 6/2010 | Pettay |
| 7,742,755 B2 | 6/2010 | Silverbrook |
| 7,747,280 B2 | 6/2010 | Silverbrook |
| 7,752,141 B1 | 7/2010 | Ogg |
| 7,753,259 B1 | 7/2010 | Taylor |
| 7,761,338 B1 | 7/2010 | Schneider |
| 7,762,470 B2 | 7/2010 | Finn |
| 7,762,885 B2 | 7/2010 | Kelly |
| 7,771,271 B2 | 8/2010 | Walker |
| 7,774,231 B2 | 8/2010 | Pond |
| 7,774,274 B2 | 8/2010 | Jones |
| 7,778,920 B2 | 8/2010 | Zarin |
| 7,780,526 B2 | 8/2010 | Nguyen |
| 7,783,532 B2 | 8/2010 | Hsu |
| 7,783,542 B2 | 8/2010 | Horowitz |
| 7,783,543 B2 | 8/2010 | Horowitz |
| 7,783,544 B2 | 8/2010 | Horowitz |
| 7,783,566 B2 | 8/2010 | Armes |
| 7,784,681 B2 | 8/2010 | Silverbrook |
| 7,784,682 B2 | 8/2010 | Taylor |
| 7,788,129 B2 | 8/2010 | Antonucci et al. |
| 7,788,188 B2 | 8/2010 | Kramer |
| 7,792,298 B2 | 9/2010 | Silverbrook |
| 7,792,539 B2 | 9/2010 | Inselberg |
| 7,792,702 B1 | 9/2010 | Katz |
| 7,796,162 B2 | 9/2010 | Ortiz |
| 7,797,005 B2 | 9/2010 | Inselberg |
| 7,797,021 B2 | 9/2010 | Silverbrook |
| 7,798,397 B2 | 9/2010 | Henry |
| 7,801,629 B2 | 9/2010 | Hale |
| 7,812,935 B2 | 10/2010 | Cowburn |
| 7,813,955 B2 | 10/2010 | Ariff |
| 7,815,114 B2 | 10/2010 | Mesaros |
| 7,818,215 B2 | 10/2010 | King |
| 7,818,392 B1 | 10/2010 | Martino |
| 7,818,415 B2 | 10/2010 | Jhanji |
| 7,822,635 B1 | 10/2010 | Brown |
| 7,822,647 B1 | 10/2010 | Mussman |
| 7,828,208 B2 | 11/2010 | Gangi |
| 7,833,101 B2 | 11/2010 | Lutnick |
| 7,840,485 B1 | 11/2010 | Warren |
| 7,843,595 B2 | 11/2010 | Silverbrook |
| 7,843,596 B2 | 11/2010 | Silverbrook |
| 7,844,492 B2 | 11/2010 | Perkowski et al. |
| 7,845,555 B2 | 12/2010 | Walker |
| 7,853,241 B1 | 12/2010 | Harrison |
| 7,854,386 B2 | 12/2010 | Silverbrook |
| 7,855,805 B2 | 12/2010 | Silverbrook |
| 7,856,360 B2 | 12/2010 | Kramer |
| 7,856,368 B2 | 12/2010 | Avallone |
| 7,856,377 B2 | 12/2010 | Cohagan |
| 7,856,414 B2 | 12/2010 | Zee |
| 7,860,871 B2 | 12/2010 | Ramer |
| 7,865,187 B2 | 1/2011 | Ramer |
| 7,865,447 B2 | 1/2011 | Rosenhaft |
| 7,870,022 B2 | 1/2011 | Bous |
| 7,873,547 B2 | 1/2011 | Borom |
| 7,873,579 B2 | 1/2011 | Hobson |
| 7,873,580 B2 | 1/2011 | Hobson |
| 7,881,965 B2 | 2/2011 | Bowles |
| 7,882,032 B1 | 2/2011 | Hoffman |
| 7,890,367 B2 | 2/2011 | Senghore |
| 7,899,710 B1 | 3/2011 | Walker |
| 7,903,029 B2 | 3/2011 | Dupray |
| 7,907,940 B2 | 3/2011 | Ramer |
| 7,908,237 B2 | 3/2011 | Angell |
| 2003/0055727 A1 | 3/2003 | Walker et al. |
| 2003/0088462 A1 | 5/2003 | Carrithers et al. |
| 2003/0163373 A1 | 8/2003 | Cornateanu |
| 2004/0010597 A1* | 1/2004 | Kirschner et al. ............ 709/228 |
| 2004/0024638 A1 | 2/2004 | Restis |
| 2004/0117250 A1 | 6/2004 | Lubow et al. |
| 2004/0128197 A1 | 7/2004 | Bam et al. |
| 2004/0238622 A1 | 12/2004 | Freiberg |
| 2005/0165682 A1 | 7/2005 | Duke |
| 2005/0240478 A1 | 10/2005 | Lubow et al. |
| 2006/0169764 A1* | 8/2006 | Ross et al. .................... 235/375 |
| 2007/0005427 A1 | 1/2007 | Walker et al. |
| 2007/0017976 A1 | 1/2007 | Peyret et al. |
| 2007/0094080 A1 | 4/2007 | Wiken |
| 2007/0228157 A1 | 10/2007 | Eckert |
| 2007/0288372 A1 | 12/2007 | Behar et al. |
| 2008/0010200 A1 | 1/2008 | Smith et al. |
| 2008/0011837 A1 | 1/2008 | Wesley |
| 2008/0059303 A1 | 3/2008 | Fordyce |
| 2008/0067232 A1* | 3/2008 | Whytock et al. .............. 235/379 |
| 2008/0077486 A1 | 3/2008 | Davis et al. |
| 2008/0120155 A1 | 5/2008 | Pliha |
| 2008/0147504 A1 | 6/2008 | Suk |
| 2008/0154676 A1 | 6/2008 | Suk |
| 2008/0177624 A9 | 7/2008 | Dohse |
| 2008/0257958 A1 | 10/2008 | Rothwell et al. |
| 2008/0262928 A1 | 10/2008 | Michaelis |
| 2008/0270243 A1 | 10/2008 | Lewis et al. |
| 2009/0005146 A9 | 1/2009 | Kelly et al. |
| 2009/0005152 A9 | 1/2009 | Kelly et al. |
| 2009/0005158 A9 | 1/2009 | Kelly et al. |
| 2009/0005170 A9 | 1/2009 | Kelly et al. |
| 2009/0006203 A1 | 1/2009 | Fordyce et al. |
| 2009/0076934 A1 | 3/2009 | Shahbazi et al. |
| 2009/0119174 A1 | 5/2009 | Pfister |
| 2009/0144164 A1 | 6/2009 | Wane et al. |

| | | | |
|---|---|---|---|
| 2009/0150211 A1 | 6/2009 | Bayne | |
| 2009/0150265 A1 | 6/2009 | Keld | |
| 2009/0182630 A1 | 7/2009 | Otto et al. | |
| 2009/0186699 A9 | 7/2009 | Kelly | |
| 2009/0313109 A1* | 12/2009 | Bous et al. | 705/14.31 |
| 2010/0070359 A1 | 3/2010 | Heasley et al. | |
| 2010/0088166 A1 | 4/2010 | Tollinger | |
| 2010/0107093 A1 | 4/2010 | Perkowski | |
| 2010/0145784 A1 | 6/2010 | Sriver et al. | |
| 2010/0293099 A1* | 11/2010 | Pauker et al. | 705/67 |
| 2010/0299195 A1* | 11/2010 | Nix et al. | 705/14.17 |
| 2011/0029364 A1 | 2/2011 | Roeding et al. | |
| 2011/0093326 A1 | 4/2011 | Bous et al. | |

OTHER PUBLICATIONS

"WSJ: Google teams with MasterCard and Citigroup for NFC payments, also files patent app" (http://engadget.com/2011/03/27/google-teams-with-mastercard-and citigroup -for-nfc . . . ), Aol Inc., New York, NY, Mar. 27, 2011.
"VeriFone puts money near mouth, says it"ll include NFC in all new POS terminals" (http://engadget.com/2011/03/07/verifone-puts-money-near-mouth-says-itll-include-nf . . . ), Aol Inc., New York, NY, Mar. 7, 2011.
"American Express challenges PayPal with 'Serve' digital platform" (http://engadget.com/2011/03/28/american-express-challenges-p . . . ), Aol Inc., New York, NY, Mar. 28, 2011.
International Search Report for International Application PCT/US10/45983, Oct. 12, 2010.
International Search Report for International Application PCT/US10/46080, Sep. 24, 2010.
International Search Report for International Application PCT/US10/46085, Sep. 24, 2010.
International Search Report for International Application PCT/US10/46416, Oct. 1, 2010.
International Search Report for International Application PCT/US10/46418, Sep. 27, 2010.
The M-Voucher Solution, Oct. 2006, 1-19, Eagle Eye Solutions, USA.
Stacia Levenfeld, Product Jump 71% on Average with EZ-PIC TM Paperless, In-Store Coupons, Jan. 7, 2008, Chicago, IL.
Paperless Coupon Pilot Boosts Sales 71% at Big Y, Jan. 8, 2008, Progressive Grocer, Springfield, Mass.
Forecasts for Management DecisionMaking, Feb. 1, 2008(as downloaded by http://gsearch.kiplinger.com/search?q= tired+of+ clipping+&entqr=0&output=xml_no_dtd&sort=date%3AD%3AL%3Ad1&client=default_frontend&ud=1&oe=UTF-8&ie=UTF-8&proxystylesheet=redesign_frontend& site=default_collection), vol. 85, No. 5, The Kiplinger Letter, Washington, DC.
Stacia Levenfeld, EZ-PIC Paperless, Instant Coupons Offers Environmentally Sound Couponing, Mar. 24, 2008, Chicago IL.
Stacia Levenfeld, EZ-PIC Paperless Coupons Help Customers Save Amid Rising Food Prices, Jun. 5, 2008, Chicago, IL.
Stacia Levenfeld, Meijer, Stater Bros., Ukrop's, and United Supermarkets begin offering EZ-PIC Paperless Coupons, Jul. 1, 2008, Chicago, IL.
Todd Rogers, Stacia Levenfeld, Paperless Coupons: BI-LO Offers One More Way to Save This Summer, Jul. 2, 2008, Mauldin, SC.
uCoupon, Downloaded on Sep. 20, 2010,You Technology, USA.
FAQ, Downloaded on Sep. 20, 2010, Zavers, USA.
International Search Report for International Application PCT/US10/45980, Oct. 1, 2010.
US 7,264,158, 09/2007, Williams (withdrawn)

* cited by examiner

CUSTOMER BENEFIT OFFER PROGRAM ENROLLMENT

FIELD OF TECHNOLOGY

Aspects of the disclosure relate to distribution and redemption of electronic offers. In particular, the disclosure relates to the acceptance of electronic offers at, or in association with, a point of sale device.

BACKGROUND

In a typical credit card transaction, a customer (the "customer") purchases from a merchant or service provider ("the merchant") goods, items or services ("the goods") using credit. The credit is extended to the customer by an issuing bank (the "issuer"). The merchant presents a debit to an acquiring bank (the "acquirer"). The acquirer pays the merchant for (and thus "acquires") the goods. A transaction processing network in communication with the issuer and the acquirer settles the transaction between the issuer and the acquirer. The transaction processing network may collect transaction processing network fees from the issuer and the acquirer in connection with the settlement.

The issuer may impose upon the acquirer a fee for participating in the transaction. The fee may be referred to as "interchange." Interchange may be a fixed fee for the transaction or a percentage of the transaction. Interchange flows from the acquirer, through the transaction processing network, to the issuer. The issuer typically uses interchange to cover costs of acquiring credit card customers, servicing credit card accounts, providing incentives to retain customers, mitigating fraud, covering customer credit risk, group comp and other expenses.

The acquirer may deduct a "transaction fee" from the amount that the acquirer pays the merchant in exchange for the goods. The transaction fee may cover the acquirer's transaction processing network fee, interchange, and other expenses. The acquirer may obtain a profit from the transaction fee.

FIG. 1 shows typical credit card transaction settlement flow 100. Flow 100 involves transaction participants such as a merchant, a customer, and transaction service providers that are identified below. At step 1, the merchant provides transaction information related to a proposed transaction between the merchant and a customer to a transaction authorization and clearance agent. The transaction authorization and clearance provider may provide transaction authorization and clearance information to the merchant. The transaction authorization and clearance information may include authorization for the transaction to proceed. At step 2, the merchant provides $100 in goods to a customer. The customer pays with a credit card. At step 3, the issuer transmits to the customer a statement showing the purchase price ($100.00) due. The issuer collects the purchase price amount, along with interest and fees if appropriate, from the customer. At step 4, the issuer routes the purchase price amount ($100.00) through the transaction processing network to the acquirer. At step 5, the acquirer partially reimburses the merchant for the purchase price amount. In the example shown in FIG. 1, the partial reimbursement is $98.00. The difference between the reimbursement amount ($98.00) and the purchase price amount ($100.00) is a two dollar ($2.00) transaction fee.

At step 6, the acquirer pays an interchange amount ($1.50), via the transaction processing network, to the issuer. At step 7, both the acquirer and the issuer pay a transaction processing network fee ($0.07 for acquirer and $0.05 for the issuer) to the transaction processing network.

TABLE 1

Net positions, by participant, based on settlement flow 100 (shown in FIG. 1).

| Participant | Net ($) |
| --- | --- |
| Issuer | 1.45 |
| Acquirer | 0.43 |
| Transaction processing network | 0.12 |
| Merchant | −2.00 |

In settlement 100 (shown in FIG. 1), the transaction fee is based on a merchant discount rate of 2%. The $1.50 interchange is based on an interchange rate of 1.5%. The sum of the transaction processing network fees ($0.07 and $0.05) is based on a total transaction processing network fee rate of 12%.

Transaction processing networks and transaction processing network services offered under the trademarks VISA, MASTERCARD, NYCE and PULSE are known. Transaction processing networks typically set interchange rates. Interchange rates often depend for each transaction processing network on merchant type and size, transaction processing method and other factors. Some transaction processing networks set rules that prohibit merchants from charging an incremental fee for credit card payments, establishing minimum or maximum purchase price amounts or refusing to accept selected cards.

The transaction fee increases the merchant's operating expenses and may cause the prices of the merchant's goods to increase.

A customer may present to the merchant one or more discount offers from the merchant or a third party. The customer usually presents the discount offer at the point of sale. By honoring the discount offer, the merchant may reduce the price of goods for the customer.

One type of discount offer is a coupon. A coupon may function like cash and be applied toward payment for goods.

For manufacturers and retailers, coupons are a tool for product marketing. Capitalizing on customers' desire for savings, coupons provide incentives to choose a particular product over a competitor's product.

One deterrent to conventional coupon use is the requirement that coupons be physically carried and presented at a point of sale. Even web-based coupons delivered electronically must be presented at a point of sale.

Conventional coupons also are not easily targeted toward the customers most likely to be interested in the featured product. Individual customer purchasing history is not always accessible to manufacturers, retailers or coupon publishers.

It would be desirable, therefore, to provide apparatus and methods for applying electronic coupons at a point of sale. It would further be desirable for the electronic coupons to be linked to a purchasing instrument, such as a credit card, a debit card, a check and bank card, a stored-value card, a bar-coded article, an instrument or device that includes a contactless chip, such as an ISO14443-compliant contactless chip, an RFID-based device, a cell phone, a personal data assistant or any other suitable electronic, encoded or information-bearing purchasing device.

SUMMARY

A method according to the invention may include using an electromagnetic receiver module, receiving data from the purchasing instrument. The method may further include using the electromagnetic receiver module, receiving from a customer a customer selection of a notification channel, the channel to be used for notifying the customer about a customer benefit. In addition, the method may include using a processor module to associate the purchasing instrument data with an account on an electronic platform so that a customer benefit offer that is stored on the platform may be associated with the purchasing instrument.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
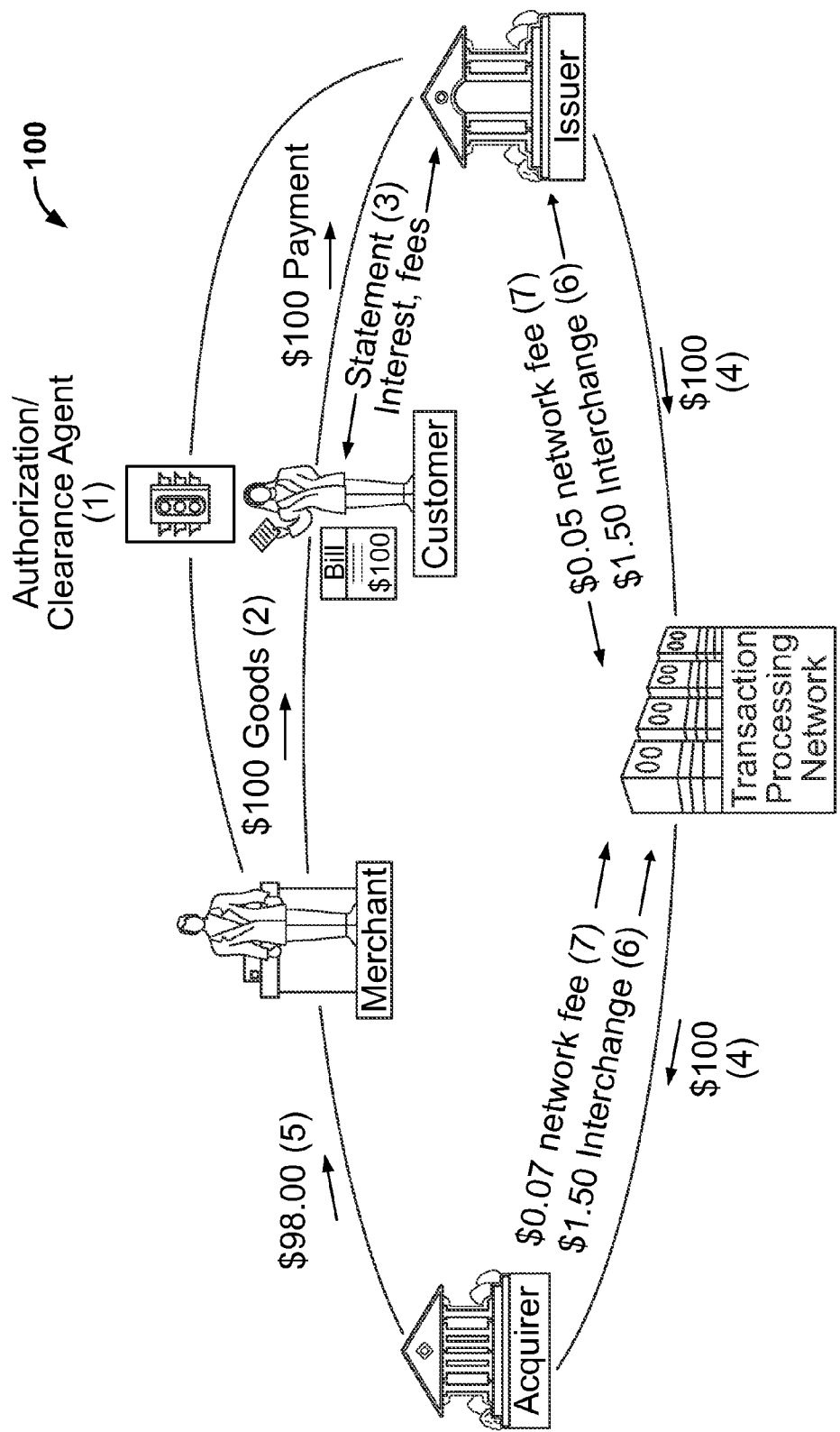
FIG. 1 shows a prior art process.

Apparatus and methods for distributing and providing a customer benefit are provided. The customer benefit may include a voucher, a certificate, an award, an incentive, a discount, a coupon, an electronic coupon, a value or any other benefit. The customer benefit may be provided to a customer in connection with the purchase of goods from a merchant.

In some embodiments, an offer agent may gather offers of customer benefits from one or more offer sources. The agent may provide offer accounts on an offer platform. The accounts may be linked to the customer, the customer's purchasing instrument or instruments, an offer source and any other suitable entity or device.

The offer agent may provide customer benefit information to the customer. The customer benefit information may notify the customer about the benefit. For example, the customer benefit information may include information about goods for which a customer benefit may be redeemed. The offer agent may provide the customer benefit itself at a point of sale terminal in connection with the customer's purchase of goods to which the customer benefit applies.

In some embodiments, the offer platform may be used for compilation, publication, storage, application and/or settlement of customer benefit offers. Use of the purchasing instrument to execute a transaction may trigger the application of customer benefits stored on the platform.

The apparatus and methods may enroll a purchasing instrument in a customer benefit program. The purchasing instrument may be a credit card, a debit card, a check and bank card, a stored-value card, a bar-coded article, an instrument or device that includes a contactless chip, such as an ISO14443-compliant contactless chip, a cell phone, an RFID-based device, a personal data assistant or any other suitable electronic, encoded or information-bearing purchasing device.

Purchasing instruments may store data in a magnetic strip, a bar code, a silicon chip or any other suitable data storage device or format. A merchant may provide a point of sale terminal that is configured to receive data from, provide data to, or exchange data with the purchasing instrument.

Enrollment of the purchasing instrument may be carried out electronically via a web-based portal, via a kiosk at a participating retailer, or by any other appropriate device or medium. A customer may enroll one or more purchasing instruments. Each of the purchasing instruments may be tied to a financial account at an issuing financial institution, such as issuer I (shown in FIG. 2). A customer may enroll purchasing instruments that are issued by different financial institutions.

In some embodiments, purchasing instrument enrollment may be carried out via a web-based portal. The web portal may be associated with the issuer of a purchasing instrument. The customer may enter account information for the purchasing instrument account which may be then be electronically verified. The customer may select one or more communication methods for the receipt of coupon offers.

In some embodiments, purchasing instrument enrollment may be carried out via a kiosk at a participating retailer. For example, the customer may swipe a payment card magnetic strip or enter another form of identification so that the account may be verified electronically. The customer may select one or more communication options for the receipt of coupon offers.

In some embodiments, a purchasing instrument may be enrolled using a pin pad in a check-out lane. The pin pad may be peripheral to or part of a POS terminal. (The use herein of "POS terminal" may include a pin pad or other customer-interactive device.) For example, an offer agent may recognize after a card swipe that the card is not enrolled. A display at the pin pad may invite the customer to enroll. The customer may enroll by pushing appropriate buttons on the pin pad. The POS terminal may print out terms of the customer benefit offer program. The terms may be printed on a sales receipt. The terms may be printed on a separate document.

After enrollment, the customer may be eligible to receive customer benefit offers. The apparatus and methods may compile customer benefit for transmission to the customer.

The customer benefit offers may be electronic versions of circulated manufacturer or retailer paper coupons, such as the coupons printed in a newspaper or in a retailer circular. Coupons may be solicited directly from manufacturers, retailers, or any other appropriate party by the offer agent.

In some embodiments, customer benefit offers may be filtered based on customer data. The customer data may be drawn from purchasing instrument account information, past purchasing instrument use, previously selected customer benefit offers, past redeemed customer benefit offers or any other appropriate data source. Examples of customer data may include information regarding geographic region, categories of product purchases, specific product purchases, shopping history with identified merchants, and any other relevant data.

Predictive analytics or any other appropriate technique may be a used to analyze the customer data and apply it to the customer benefit offers. A set of customer benefit offers may be narrowed, as customer benefit offers that are compatible with the customer data are chosen and incompatible customer benefit offers are not chosen. For example, the address on a debit card account may be used to direct customer benefit offers from local retailers to a customer.

The filtered customer benefit offers may be stored and transmitted to a customer via communication methods that the customer may select, for example, upon enrollment in an offer program. The customer may modify the communication methods selected or select additional methods of communication. The customer benefit offers may be transmitted to the customer weekly, monthly or on any other appropriate schedule. In addition to, or in place of, the scheduled transmission, individual offers or groups of offers may be transmitted as a special promotion.

In some embodiments, the communication method may involve an email message. Customer benefit offers may sent via email and the desired coupon offers may be selected. Reminders regarding available offers may also be sent in email messages.

In some embodiments, the communication method may involve transmission to a mobile device. For example, a text message to a mobile phone may be used to deliver customer benefit offer information. Reminders about available offers or offers previously selected may also be sent to a mobile device. For example, entering a participating retail location may trigger a message regarding customer benefit offers available for use.

In some embodiments, customer benefit offers may be available via a web-based portal. The website may be associated with a purchasing instrument provider. Reminders may be sent via another communication method, such as an email or text message, regarding the availability of customer benefit offers for selection, and/or the availability of selected customer benefit offers for use.

In some embodiments, the offer platform may communicate customer benefit offer information to a customer upon receiving an indication that the customer has presented an enrolled purchasing instrument at a POS terminal. In some embodiments, the offer platform may communicate the customer benefit offer information to the customer upon receiving an indication that the customer has presented for purchase goods for which a customer benefit offer is present in an offer platform account to which the customer and/or the customer's purchasing instrument is linked. In some embodiments, transmission of the customer benefit offer information may be via the POS terminal at which the customer presented the purchasing instrument or the goods.

For example, when a customer presents for purchase a particular item at merchant M and the item is logged for purchase (scanned, e.g.) by the POS terminal, the offer platform may identify and transmit to the customer customer benefit information regarding a customer benefit that is available for the item when purchased at merchant M.

In some embodiments, the customer benefit offers may be available via a kiosk at a participating retailer. The customer may select any desired offers, print a record of them at the kiosk and immediately proceed to shop for the featured items.

In some embodiments, the communication method may be associated with regular communication related to a bank account underlying the purchasing instrument. For example, the list of available customer benefit offers may be appended to a monthly financial statement, whether an electronic statement or a paper copy. In another example, a reminder may appear on a printed receipt from an ATM transaction.

In some embodiments, after receiving the customer benefit offer information, the customer may select one or more customer benefit offers. The selected customer benefit offers may be stored for later redemption and viewed at any time via a web-based portal, a kiosk or using any other appropriate method. For example, the selected customer benefit offers may be stored on the offer platform and applied at checkout when payment is made with the enrolled purchasing instrument.

In some embodiments, the customer benefit offers may be discounts that are associated with use of a purchasing loyalty card. The purchasing loyalty card may be issued by a merchant, a manufacturer, a service provider or any other suitable vendor or provider of goods. Conventionally, presenting a loyalty card at a point of sale triggers merchant-specific discounts on various products. Loyalty card discounts from participating merchants may be stored on the platform and linked to the enrolled payment account, in some embodiments, even without communication to (or selection by) the customer. Payment with the enrolled purchasing instrument may trigger the application of loyalty card discounts, in some embodiments, even without presentation of the loyalty card at the point of sale. Linking loyalty card discounts to the purchasing instrument may allow a single payment instrument to replace one or more loyalty cards from different participating merchants.

At a point of sale, goods may be scanned for checkout. Any paper coupons may be applied, any merchant loyalty card may be processed, and these discounts may be deducted from product prices. At this point, the customer may pay with the enrolled purchasing instrument. The purchasing instrument information and product identifiers such as stock-keeping unit numbers ("SKUs") may be transmitted to the platform. The stored coupons may be compared to the product SKUs. Stored coupons corresponding to purchased goods may be applied. The coupon data may be transmitted from the platform to a merchant at the point of sale. Prices may be adjusted as the coupon discounts are applied. In some embodiments, the discounts stemming from the coupons may be itemized separately on the customer receipt.

After application in connection with a transaction, redeemed customer benefit offers may be processed for electronic settlement. Data associated with the redeemed customer benefit offers may be transmitted to a clearinghouse for processing. Payment may be made electronically to reimburse the merchant. Payment may also be made to another party such as a manufacturer, retailer or coupon provider, as part of a negotiated relationship with the publisher of the customer benefit offers.

Data regarding the customer benefit offer redemption may be stored on the platform for analysis. The sales data may be used to direct appropriate customer benefit offers to the customer going forward.

Illustrative embodiments of the invention will now be described with reference to FIGS. 1-26.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 2:
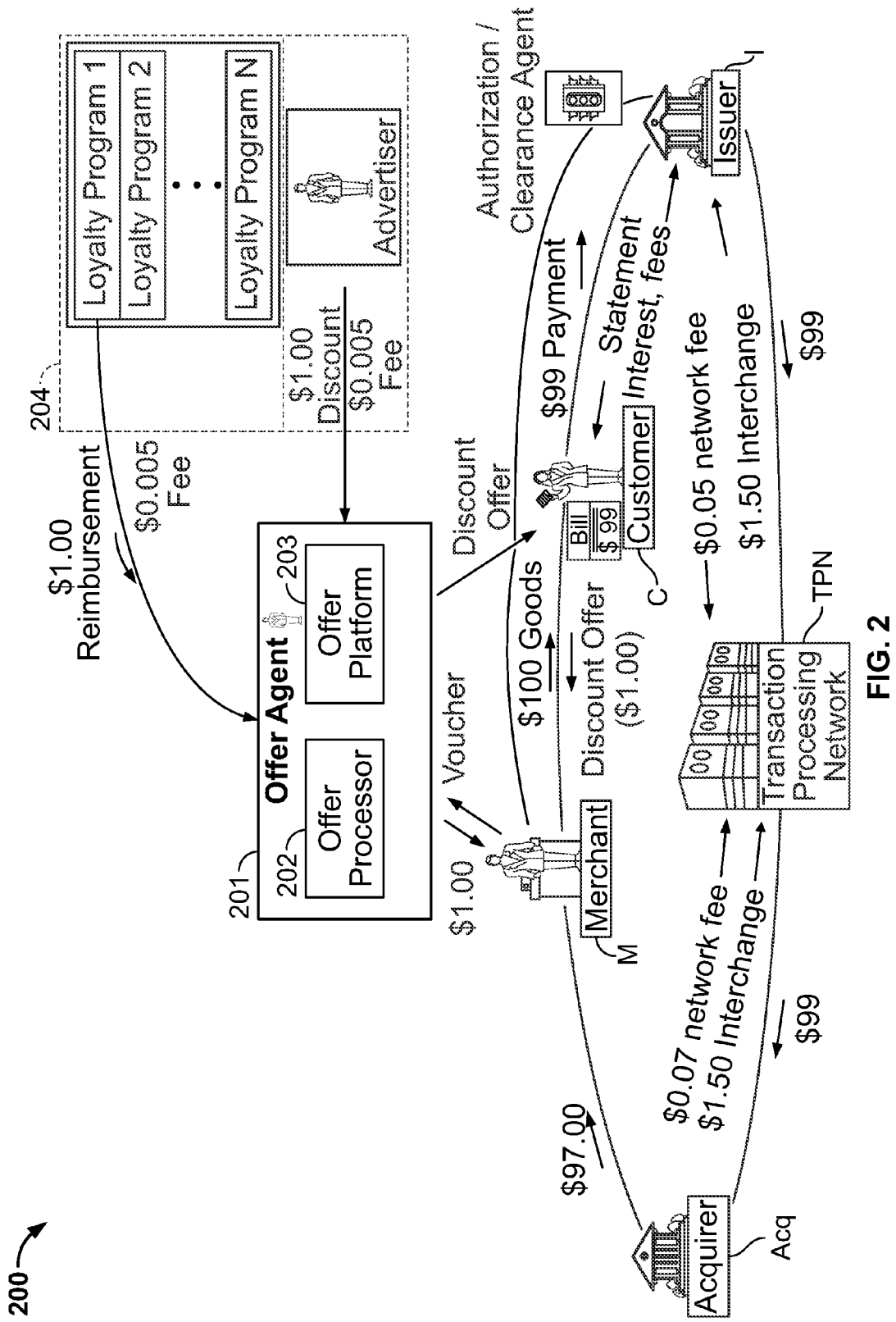
FIG. 2 shows an arrangement in which apparatus and methods in accordance with the principles of the invention may be used.

FIG. 2 shows illustrative arrangement 200 for executing a transaction between customer C and merchant M. Arrangement 200 may include offer agent 201. Offer agent 201 may control offer processor 202 and offer platform 203. Offer processor 202, in conjunction with offer platform 203, may provide customer C with a discount offer. Offer Customer C may present the discount offer to merchant M to offset the purchase price of goods. Merchant M may provide the goods to customer C based on acquisition of the goods by acquirer ACQ, a credit relationship between customer C and issuer I, and a settlement relationship between issuer I and acquirer ACQ. (The settlement relationship may be based on a transaction processing network, as shown in FIG. 2, or any other suitable settlement relationship.)

Merchant M may provide a voucher to offer processor 202. Offer processor 202 may effect reimbursement of merchant M in the amount of the discount offer. FIG. 2 illustrates the discount offer as $1.00. Offers sources 204 may provide discount offers to offer agent 201. Offer agent 201 may provide the discount offers to customer C. Customer C may select the discount offers that customer C desires. The desired discount offers may be stored in an account on offer platform 203 for later use by customer C. In some embodiments, the discount offers may be pushed into the account without customer C's selection. In such embodiments, customer C may redeem at a POS terminal (e.g., of merchant M) some or all of the coupons in customer C's account that are valid for goods that merchant M processes (e.g., at "register check-out") for purchase by customer C.

Offer sources may include one or more of a loyalty program, an advertiser, a consumer packaged goods manufacturer, a retailer, a bank, a restaurant or any other suitable entity. FIG. 2 shows that an offer source may provide a monetary reimbursement to the offer platform (e.g., $1.00, as illustrated). The offer source may also pay a fee to the offer platform (e.g., $0.005, as illustrated). The reimbursement funds and fees may be routed in any suitable manner, and in any suitable proportions, to any of the participants in the transaction.

Figure 3:
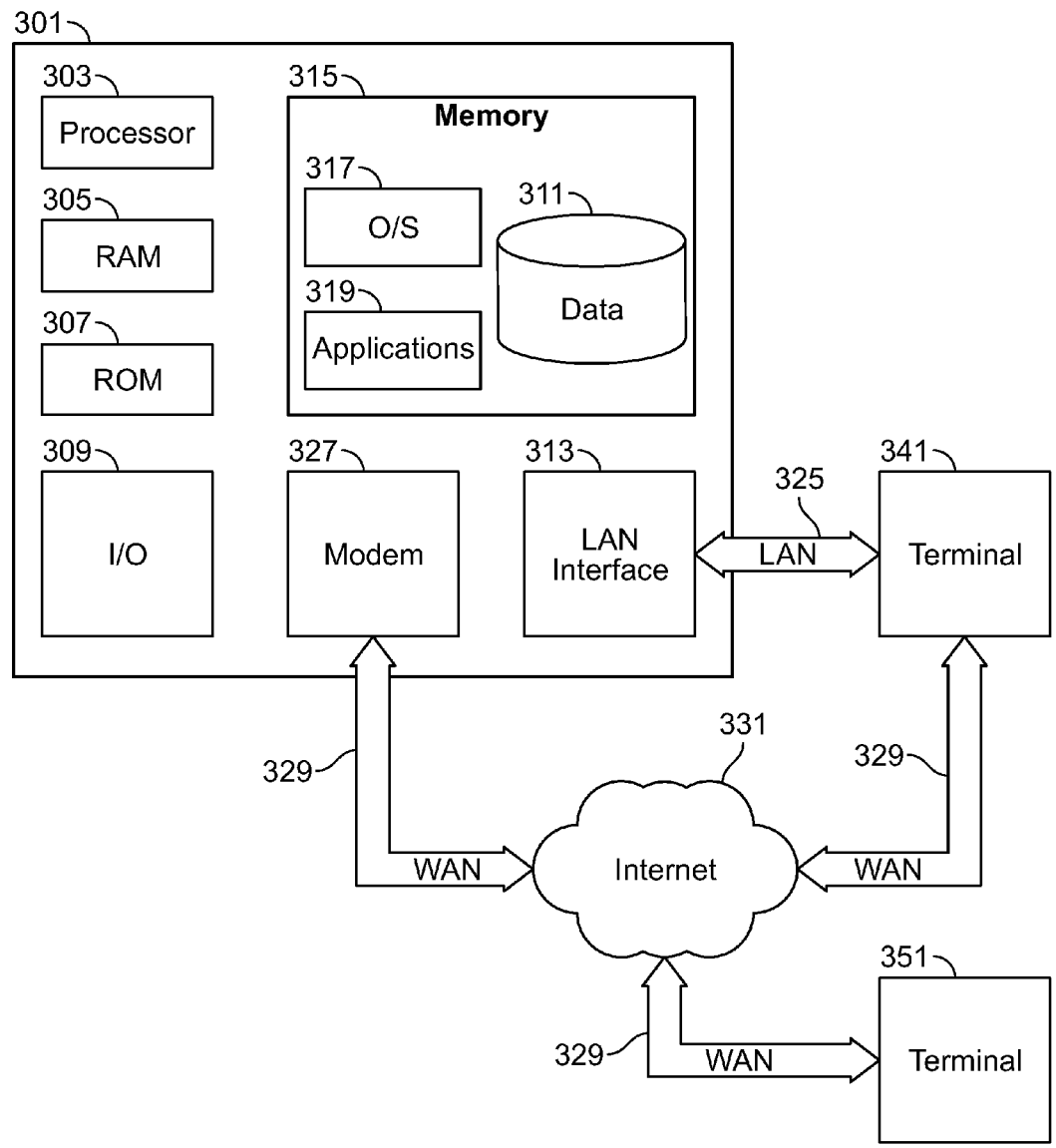
FIG. 3 shows apparatus in accordance with the principles of the invention.

FIG. 3 is a block diagram that illustrates a generic computing device 301 (alternatively referred to herein as a "server") that may be used according to an illustrative embodiment of the invention. The computer server 301 may have a processor 303 for controlling overall operation of the server and its associated components, including RAM 305, ROM 307, input/output module 309, and memory 315.

Input/output ("I/O") module 309 may include a microphone, keypad, touch screen, and/or stylus through which a user of device 301 may provide input, and may also include one or more of a speaker for providing audio output and a video display device for providing textual, audiovisual and/or graphical output. Software may be stored within memory 315 and/or storage to provide instructions to processor 303 for enabling server 301 to perform various functions. For example, memory 315 may store software used by server 301, such as an operating system 317, application programs 319, and an associated database 321. Alternatively, some or all of server 301 computer executable instructions may be embodied in hardware or firmware (not shown). As described in detail below, database 321 may provide storage for enrolled purchasing instrument information, available customer benefit offer information, customer selections of customer benefit offers, redeemed customer benefit offers data and any other suitable information.

Server 301 may operate in a networked environment supporting connections to one or more remote computers, such as terminals 341 and 351. Terminals 341 and 351 may be personal computers or servers that include many or all of the elements described above relative to server 301. The network connections depicted in FIG. 3 include a local area network (LAN) 325 and a wide area network (WAN) 329, but may also include other networks. When used in a LAN networking environment, computer 301 is connected to LAN 325 through a network interface or adapter 323. When used in a WAN networking environment, server 301 may include a modem 327 or other means for establishing communications over WAN 329, such as Internet 331. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 319, which may be used by server 301, may include computer executable instructions for invoking user functionality related to communication, such as email, short message service (SMS), and voice input and speech recognition applications.

Computing device 301 and/or terminals 341 or 351 may also be mobile terminals including various other components, such as a battery, speaker, and antennas (not shown).

Terminal 351 and/or terminal 341 may be portable devices such as a laptop, cell phone, blackberry, or any other suitable device for storing, transmitting and/or transporting relevant information.

Data related to coupon offers, data related to purchasing instrument use and any other suitable information may be stored in memory 315.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 4:
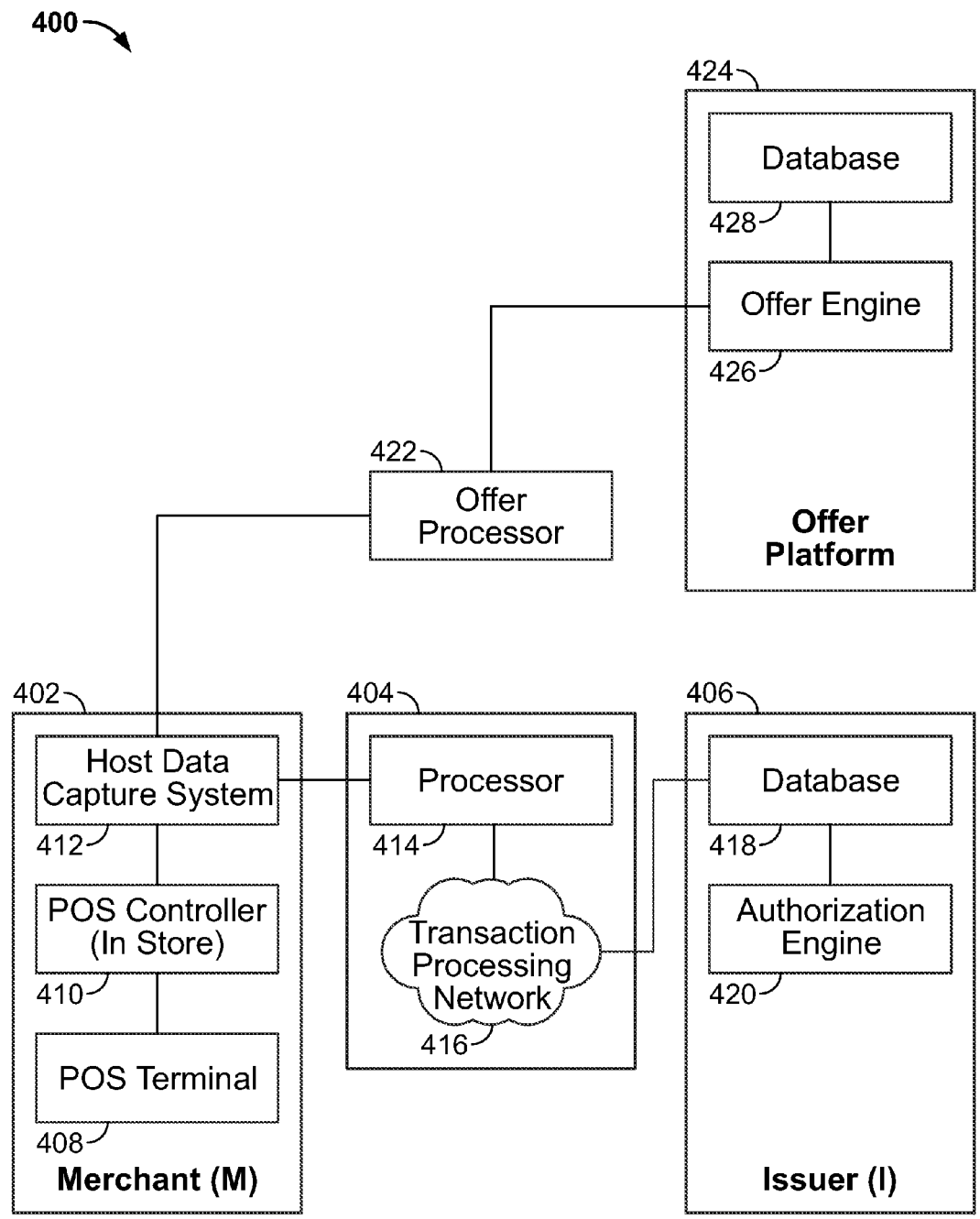
FIG. 4 shows other apparatus in accordance with the principles of the invention.

FIG. 4 shows illustrative system 400 for processing and communicating transaction information. The transaction information may include customer information, merchant information, purchasing instrument information, financial information, customer benefit information, inventory information and any other suitable information.

System 400 may include merchant component 402, network component 404 and issuer component 406. In general, a system such as 400 may include many merchant components such as 402 and many issuer components such as 406. System 400 may include offer processor 422 and offer platform 424. Offer processor 422 may correspond to offer processor 202 (shown in FIG. 2). Offer platform 424 may correspond to one or more of offer sources 204 (shown in FIG. 2). In some embodiments, offer platform 424 may include offer processor 422.

A customer may purchase goods by transferring customer information from a purchasing instrument, such as a credit card, to POS terminal 408. POS terminal 408 may read the customer information from the purchasing instrument. The customer information may include purchasing instrument identification information (e.g., a credit card number, a device identifier or other suitable identifier), issuer information, account information and any other suitable information. In some embodiments, sensitive information, such as purchasing instrument identification information, may be hashed using any suitable hash function prior to storage and/or transmission to other devices.

POS terminal 408 may transmit transaction information to POS controller 410. The transaction information may include some or all of the customer information and any other suitable information, such as the transaction amount and information regarding the purchased goods (such as SKU information).

In some embodiments, the transaction information may include offer information. The offer information may include information by which the customer may obtain a discount on the price of the goods. For example, the offer information may include a purchasing instrument identifier, a customer benefit offer identifier, information regarding the purchased goods and the like).

POS controller 410 may act as a server for providing user prompts and displaying layout information to one or more POS terminals such as POS terminal 408. POS controller 410 may receive transaction information from one or more of the POS terminals.

POS controller 410 may transmit the transaction information to host data capture system 412. Host data capture system 412 may store transaction information from POS controller 410. Host data capture system 412 may store accounting data, inventory data and other suitable data that may be included in the transaction information.

Host data capture system 412 may route merchant information to processor 414. Processor 414 may include a credit card network "processor," which is known to those of ordinary skill in the art. The illustrative systems shown in FIGS. 4 and 5 may include one or more other processors that perform tasks that are appropriate for the components thereof.

The merchant information may include some or all of the transaction information. The merchant information may include information about the merchant, the merchant's business, the merchant's network membership, the merchant's business behavior and any other suitable information. Processor 414 may route some or all of the merchant information, via network 416, to database 418. The routing may be governed by transaction information. For example, the routing may be governed by a bank issuer number ("BIN") that is encoded in the customer's credit card. Authorization engine 420 may render a transaction authorization decision based on the merchant information.

Authorization engine 420 may transmit authorization information back to POS terminal 408 through network 416, processor 414, host data capture system 412 and POS controller 410. The authorization information may include the authorization decision (e.g., "GRANTED" or "DENIED"). The authorization information may include some or all of the merchant information. The merchant information may be used by processor 414 to route the authorization information back to the merchant and the POS terminal where the customer is present.

Transaction information may include some or all of the information that is necessary to identify the transaction fee for the transaction. The transaction fee may depend on one or more transaction fee factors, such as interchange rate, network rates, merchant type, merchant size, transaction processing method, and any other suitable factors. Transaction information may include one or more of the foregoing factors and any other suitable factors.

The transaction information may be stored in any suitable element of merchant component 402, network component 404 and issuer component 406. For example, transaction information may be stored in processor 414. Processor 414 may include algorithms that may be used in conjunction with the transaction information to identify the transaction fee corresponding to the customer transaction taking place at POS terminal 408. After the transaction fee is identified, processor 414 may transmit the transaction fee, via merchant components 402, to POS terminal 408. POS terminal 408 may display the transaction fee for viewing by the customer.

POS terminal may have one or more interactive features that the customer may use. The features may provide the customer with information that may help the customer decide whether to execute the transaction. The customer may use the features to obtain more information about the merchant, the transaction, the transaction fee, transaction fees associated with different purchasing instruments (e.g., credit cards, debit cards, instruments or devices that include a contact chip, such as an ISO14443-compliant contactless chip, or other electronic purchasing devices) or other suitable information.

Purchasing instruments may store data in a magnetic strip, a bar code, a silicon chip or any other suitable data storage device or format.

When offer information is present in the transaction information, host data capture system 412 may determine, prior to routing the transaction information to processor 414, whether the customer's purchasing instrument and/or associated customer benefit offers qualifies for redemption of one or more offers that are included in the offer information.

In some embodiments, host data capture system 412 may transmit customer benefit offer information to offer processor 422. The customer benefit offer information may identify an offer for a customer benefit in connection with an item that the customer has presented at checkout for payment. In some of these embodiments, offer processor 422 may determine whether the customer has acknowledged receipt of the customer benefit offer. The acknowledgment may be logged by offer platform 424. If the acknowledgment was logged, offer processor 422 may transmit to host data capture system 412 a validation message indicating that the customer is entitled to the customer benefit. If the acknowledgment was not logged, offer processor 422 may transmit to host data capture system 412 a message indicating that the customer is not entitled to the customer benefit. In such embodiments, a customer may be denied the benefit if the customer has not acknowledged receipt of the customer benefit offer.

In some embodiments, acknowledgment may not be required.

In some embodiments, POS terminal 408 may be provided with logic configured to detect a situation in which the customer first presents a purchasing instrument that is qualified for offer redemption and then executes payment of the transaction with a different purchasing instrument that is not qualified for the redemption.

If the purchasing instrument is qualified for the redemption, host data capture system 412 may transmit some or all of the offer information to offer processor 422. Offer processor 422 may decrypt (using an inverse hash function, e.g.) hashed information, such as the purchasing instrument identifier. Offer processor 422 may use the decrypted information to associate the purchasing instrument with an offer platform such as 424. Offer processor may transmit the offer information to offer engine 426 in offer platform 424. Offer engine 426 may query database 428 for customer benefit information. The customer benefit information may include one or more discounts, incentives, vouchers or further offers. For example, the customer benefit information may include a discount amount for purchase of product X, a coupon for savings on a future purchase of product Y, a voucher for a product offered by merchant M or a partner or affiliate of merchant M or further offers or coupons for future transaction with merchant M.

Offer engine 426 may route the customer benefit information back to POS terminal 408. POS terminal 408 may deduct discount amounts from the purchase price of the goods and recalculate any amounts payable. POS terminal 408 may then transmit transaction information to POS controller 410 and initiate transaction information processing as discussed above in connection with merchant component 402, network component 404 and issuer component 406.

Figure 5:
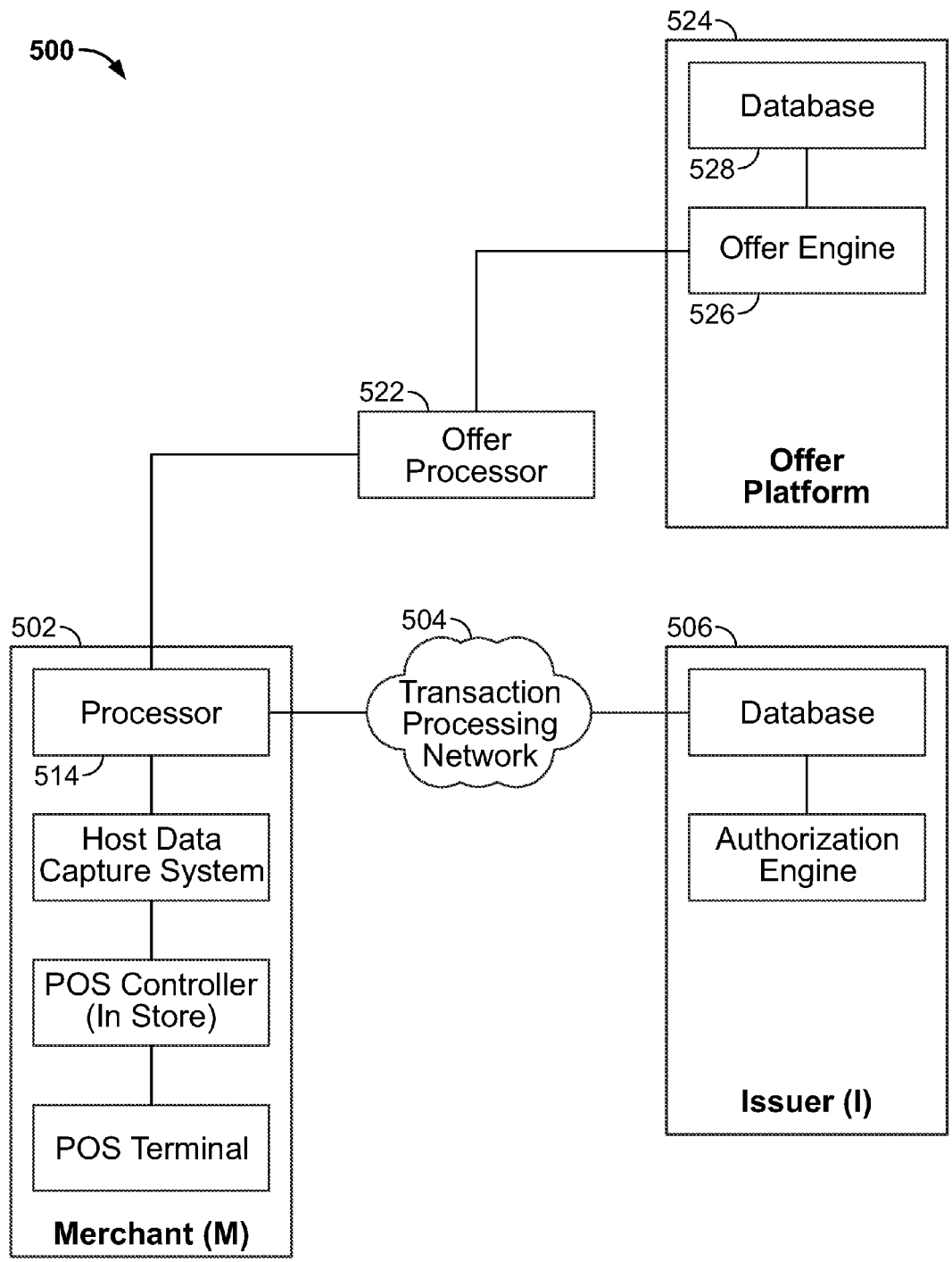
FIG. 5 shows yet other apparatus in accordance with the principles of the invention.

FIG. 5 shows illustrative system 500 for processing and communicating transaction information. System 500 may include merchant component 502, network component 504 and issuer component 506. In general, a system such as 500 may include many merchant components such as 502 and many issuer components such as 506. System 500 may have one or more of the features that are described herein in connection with system 400. For example, system 500 may include offer processor 522 and offer platform 524. Offer platform 524 may include offer engine 526 and database 528. Offer processor 522, offer platform 524, offer engine 526 and database 528 may have one or more of the features that are described herein in connection with offer processor 422, offer platform 424, offer engine 426 and database 428 (all shown in FIG. 4), respectively.

In system 500, processor 514 may be present in merchant component 502. Corresponding processor 414 is present in network component 404 (shown in FIG. 4). Systems such as 400 are designed for merchants that require high throughput of merchant information and transaction information. Systems such as 500 are designed for merchants that do not require high throughput of merchant information and transaction information.

Figure 6:
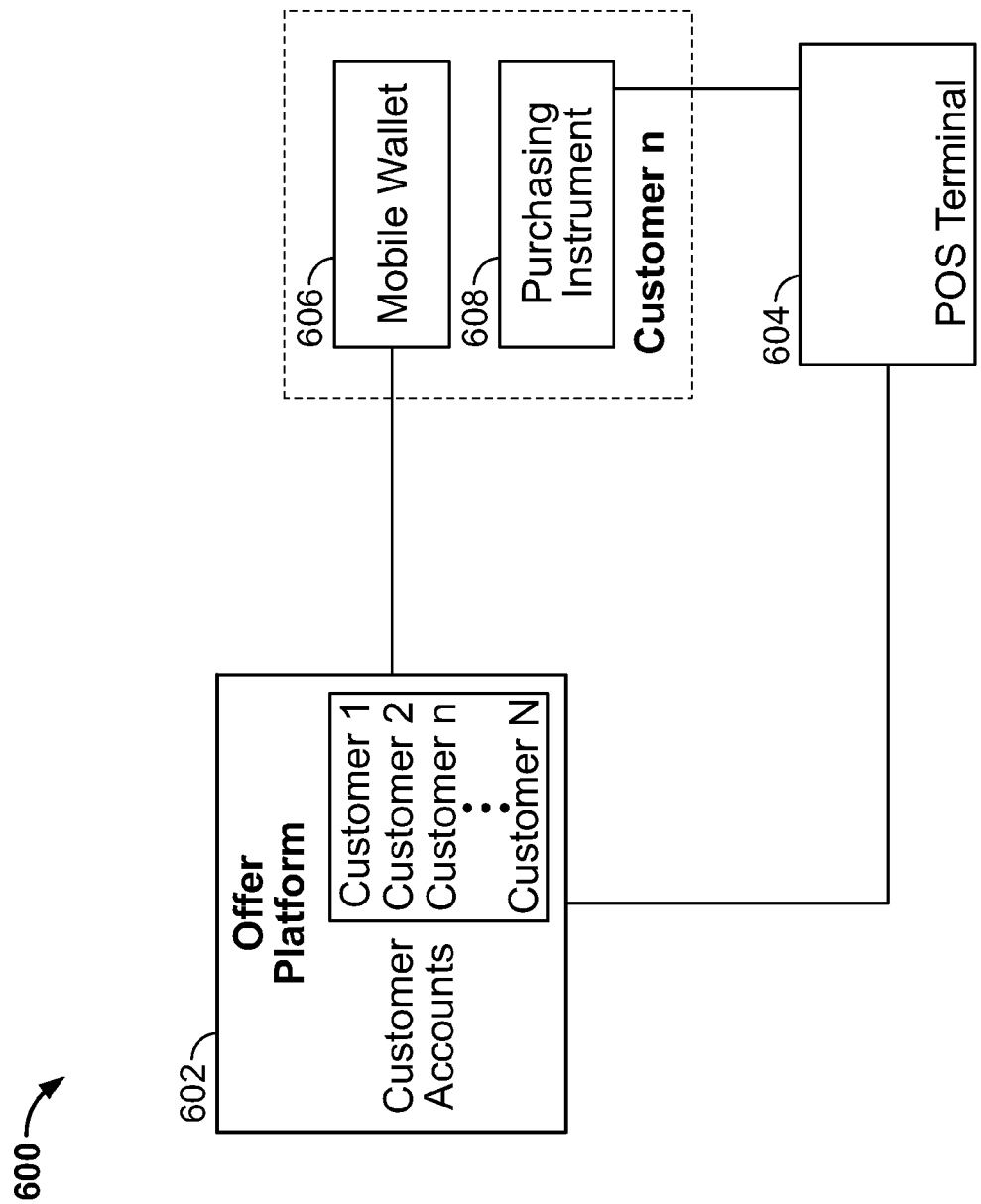
FIG. 6 shows still other apparatus in accordance with the principles of the invention.

FIG. 6 shows illustrative architecture 600 for transmission of offer notifications from an offer platform such as 602 to a customer such as customer n and for transmission of customer information from customer n to a POS terminal such as 604.

In architecture 600, customer n may receive offer notifications from offer platform 602 via mobile wallet 606, which may be in communication with the operating system of a cellular telephone. The notifications may include information regarding discounted products, offering merchants, locations, discount amounts, offer terms (including, for example, a period of validity, identities of participating merchants and the like) and other suitable information. Offer platform 602 may select the offers for which to send the notifications based on an account established for customer n on offer platform 602. Customer n may use the offer notifications in connection with purchasing decisions.

When customer n purchases one or more items from a merchant, customer n may present purchasing instrument 608, such as a credit card, to the merchant. The credit card may include offer information, such as an identification number. The identification number may be a credit card number. POS terminal 604 may transmit the number to offer platform 602. Offer platform 602 may return to POS terminal 604 customer benefit information that corresponds to customer n's account. POS terminal 604 may identify in the customer benefit information benefits that correspond to goods that customer n has presented for purchase at POS terminal 604. POS terminal may apply the benefits to the transaction with customer n.

Figure 7:
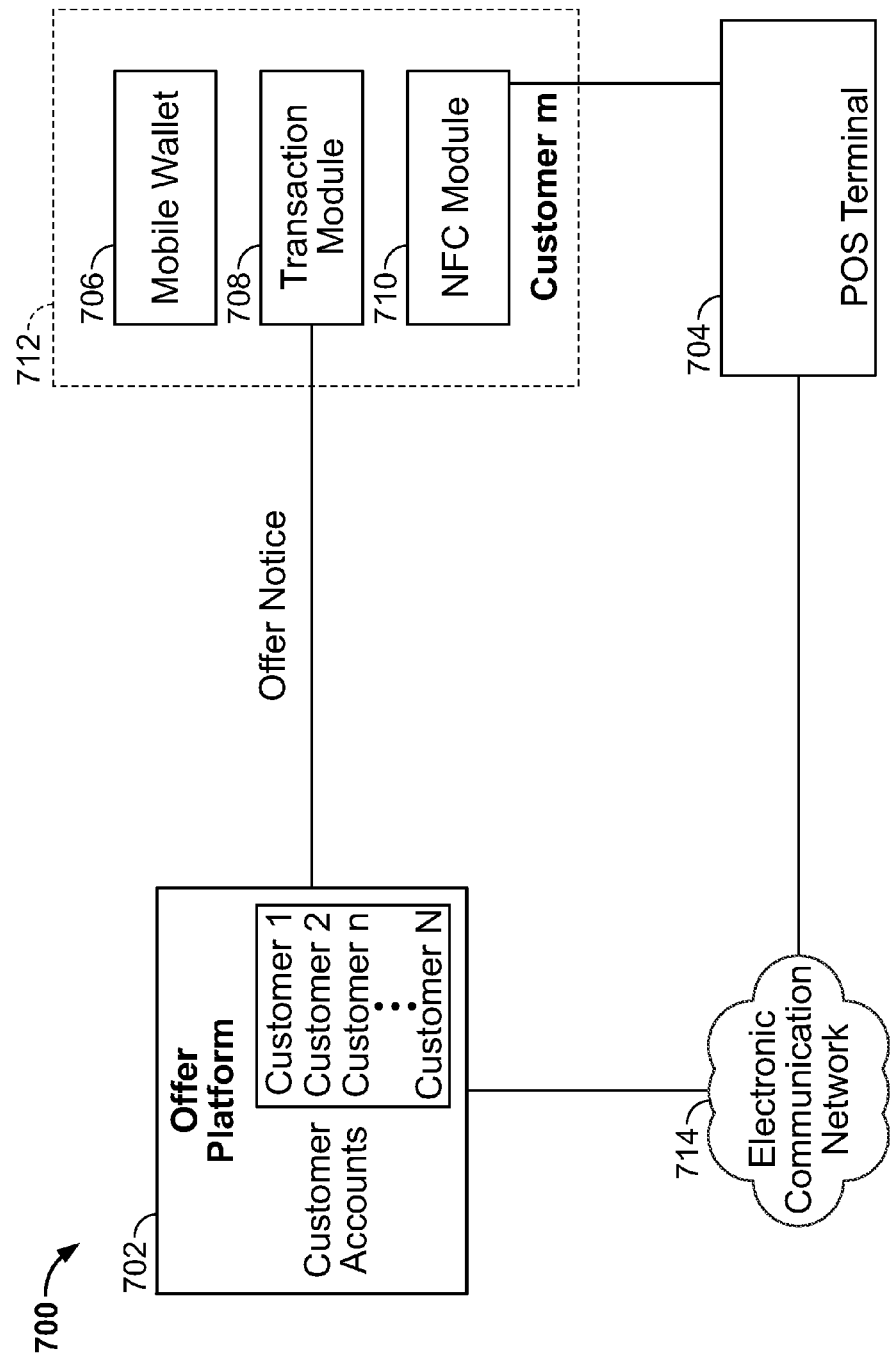
FIG. 7 shows still other apparatus in accordance with the principles of the invention.

FIG. 7 shows illustrative architecture 700 for transmission of offer notifications from an offer platform such as 702 to a customer such as customer m and for transmission of customer information from customer m to a POS terminal such as 704. POS terminal 704 may be an internet protocol based POS terminal.

In architecture 700, offer platform 702 may transmit to customer m offer notifications and customer benefit information. The offer notifications may be transmitted using a protocol that requires validation of customer m's identity. Customer m's identity may be encoded in mobile wallet 706, which may be present in purchasing instrument 712. For example, mobile wallet 706 may be in a cellular telephone and may be in communication with the operating system of the cellular telephone. Mobile wallet 706 may include secure identification information that associates customer m with customer m's personal and credit information.

The notifications may include information regarding discounted products, offering merchants, locations, discount amounts and other suitable information. Offer platform 702 may select the offers for which to send the notifications based on an account established for customer m on offer platform 702. Customer m may view the notifications on a display (not shown) on purchasing instrument 712. Customer m may use the offer notifications in connection with purchasing decisions.

When customer m purchases one or more items from a merchant, customer m may present purchasing instrument 712 to the merchant. Purchasing instrument 712 may include transaction module 708. Transaction module 708 may include instructions and protocols for exchanging customer, offer, customer benefit, transaction and any other suitable information with POS terminal 704. Purchasing instrument 712 may include near field communication ("NFC") module 710 for wireless communication of the customer, offer, customer benefit, transaction and other suitable information with POS terminal 704.

POS terminal 704 may use some or all of the customer, offer, customer benefit, transaction and other suitable information to recalculate prices that customer m will pay for goods being purchased.

POS terminal 704 may communicate with offer terminal 702 via electronic communication network 716. Electronic communication network 716 may be the Internet. POS terminal 704 may communicate with offer platform 702 to validate the validity of information such as offer information, customer benefit information and other suitable information. POS terminal 704 may communicate with offer platform 702 to verify that customer m is entitled to present an offer. POS terminal 704 may communicate with offer platform 702 to verify the identity of the entity that is to pay for the value of the offer (e.g., a product manufacturer). POS terminal 704 may communicate with offer platform 702 to notify the paying entity about the transaction.

Figure 8:
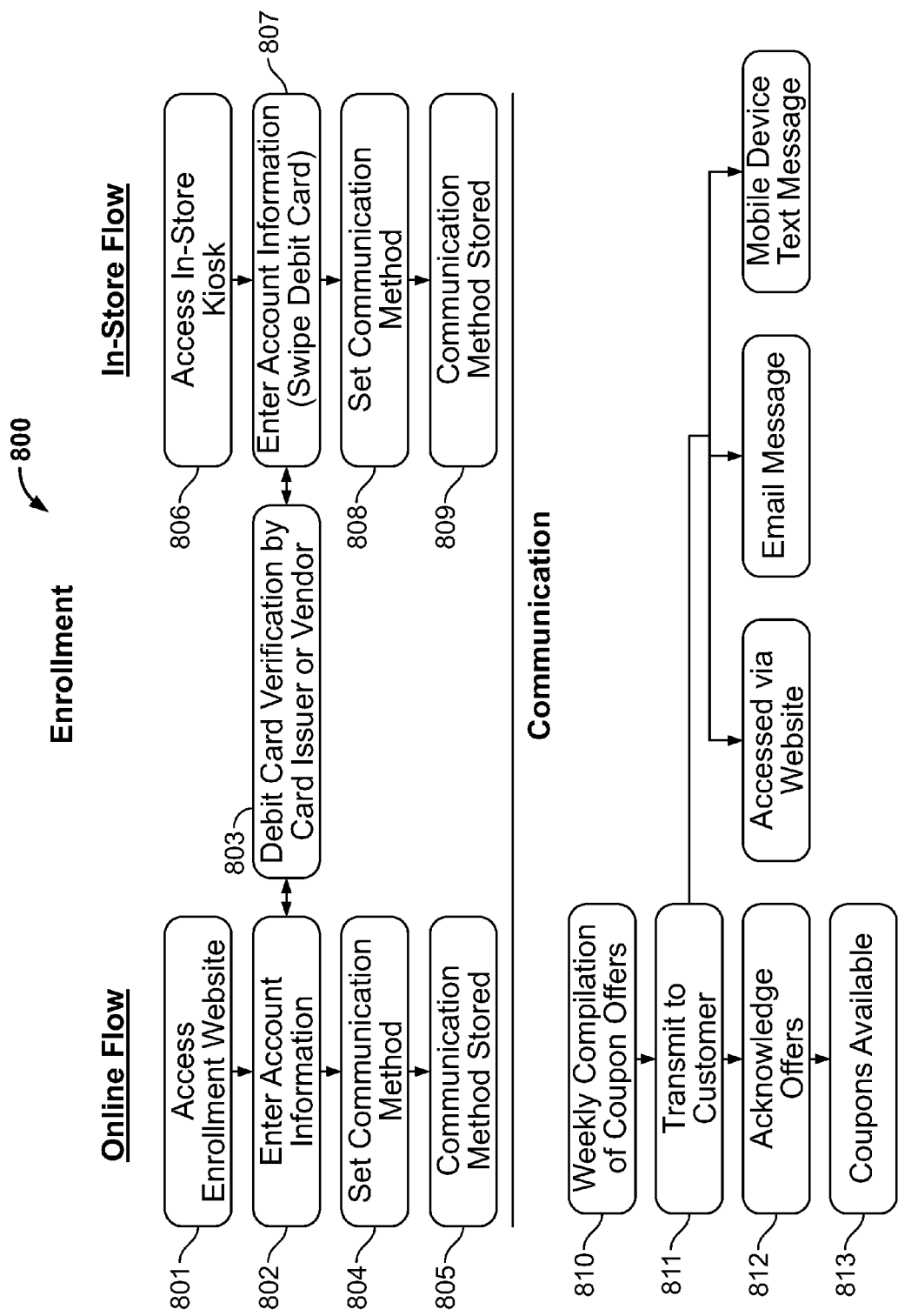
FIG. 8 is a flow diagram of a process in accordance with the principles of the invention.

FIG. 8 shows illustrative process 800 for enrollment of a purchasing instrument and establishment of communication methods. In illustrative process 800, the purchasing instrument is a debit card and the customer benefit offer is an electronic coupon. The vertical paths in the flow diagram show primary processes and the horizontal paths show related sub-processes.

Process 800 shows two parallel methods for debit card enrollment. At steps 801 through 805, the debit card is enrolled via a web-based portal associated with the debit card provider. At steps 806 through 809, the debit card is enrolled via a kiosk.

At step 801, a customer accesses the enrollment website. At step 802, the customer enters account information. At step 803, the account information is verified. At step 804, the customer selects a communication method. More than one communication method may be selected. At step 805, the communication method preferences are stored.

In some embodiments, the communication method may support bidirectional communication between an offer platform such as offer platform 424 (shown in FIG. 4) and a customer such as customer C (shown in FIG. 2). The offer platform may transmit, via the selected communication method, customer benefit offer information to the customer. The customer benefit offer information may include information about benefits that are available to the customer. The customer may acknowledge receipt of the customer benefit information. Appropriate apparatus (such as a personal computer, a cell phone, a PDA, a kiosk, an ATM or any other suitable apparatus) may transmit customer benefit offer acknowledgment information to the offer platform. The offer platform may log receipt of the customer benefit offer acknowledgment. In some embodiments, the receipt may be used as a requirement for authorizing application of the customer benefit at a POS terminal.

In an alternative enrollment process, at step 806, a customer accesses a kiosk at a participating retailer. At step 807, the customer enters account information by swiping the magnetic stripe of the debit card in a card reader. At step 808, the customer selects a communication method. At step 809, the communication method preferences are stored.

A more detailed illustration of the communication methods from steps 804 and 808 is detailed at steps 810 through 813.

In illustrative process 800, a list of coupon offers is transmitted to the customer on a weekly basis. At step 810, the weekly list of coupon offers is compiled. At step 811, the list of coupon offers is transmitted to the customer. Process 800 includes three illustrative methods of transmission: making the list available on a website, sending the list in an email message, or sending a text message to a mobile device. At step 812, the customer acknowledges the offers and may select coupons for application. The selected coupons are stored. At step 813, the coupons are available for application at a point of sale. The coupon discounts will be applied when the enrolled debit card is used for a purchase at a point of sale.

Figure 9:
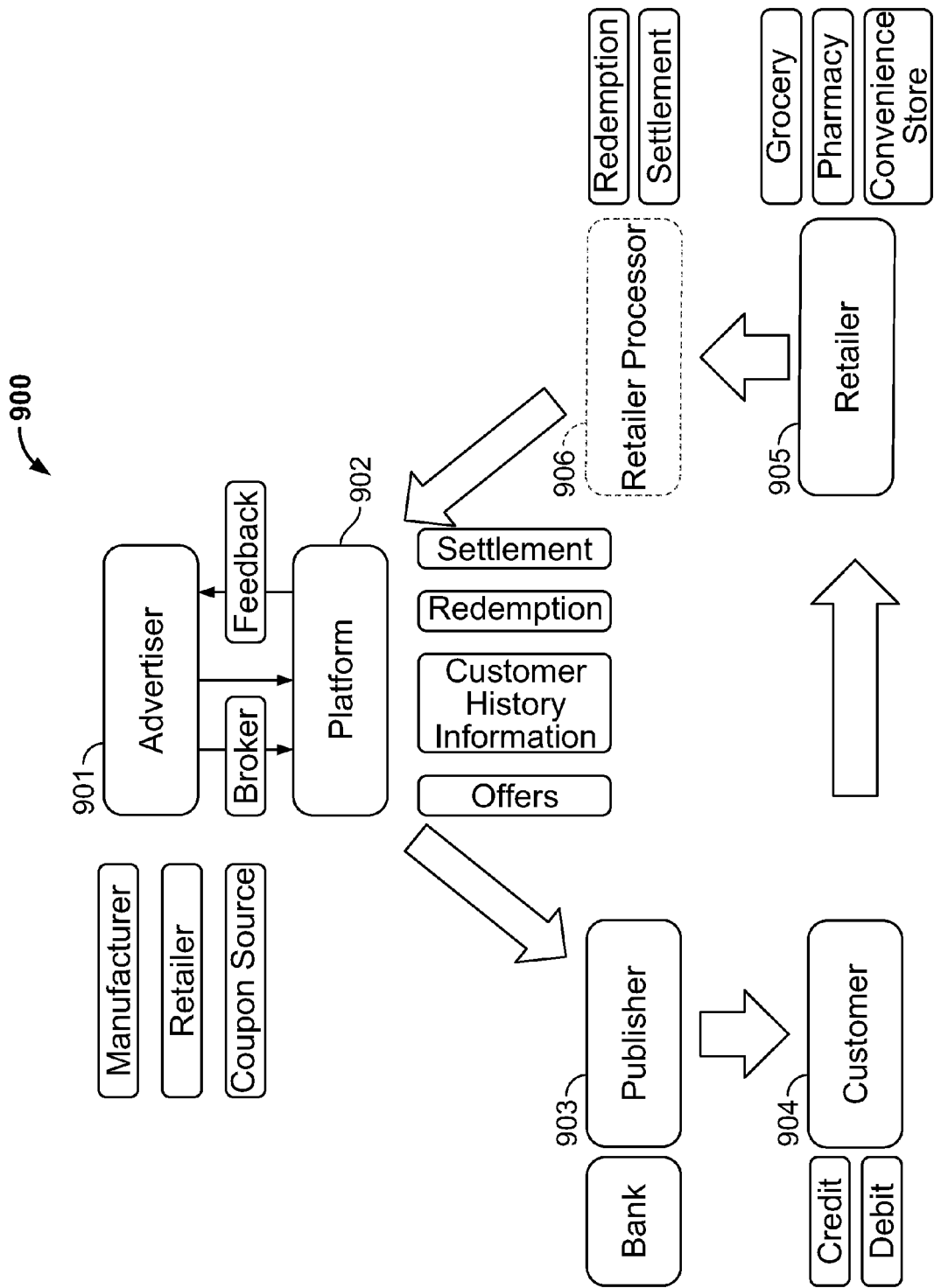
FIG. 9 is a high level flow diagram of another process in accordance with the principles of the invention.

FIG. 9 shows high level process 900 illustrating the entities involved in customer benefit offer publication, selection and redemption. The primary entities identified in process 900 may be companies, individuals or technological processes. In process 900, the customer benefit offer is an electronic coupon offer.

Entity 901 is an advertiser. Entity 902 is an integrated electronic platform. Coupon offers from various advertisers may be compiled on the integrated electronic platform. Sources for coupon offers include manufacturers, retailers and commercial coupon sources. Predictive analytics may be applied filter the offers based on customer history. Entity 903 is a publisher of coupon offers. The publisher may be a payment card provider in a coupon offer program designed for its payment card users. In illustrative process 900, the publisher is a bank publishing coupons for account holders enrolling a bank issued debit or credit card. Entity 904 is a customer with a debit or credit card. The customer may enroll the card and choose a communication method to receive the published coupons. Entity 905 is a retailer. The customer may use the enrolled payment card at a participating retailer to trigger application of coupons. Entity 906 is a retail processor. Coupons may be processed for redemption and settlement by the retailer or may be electronically transmitted directly to the platform for redemption and settlement. Feedback regarding coupon redemption may be transmitted back to the advertiser 901.

Figure 10:
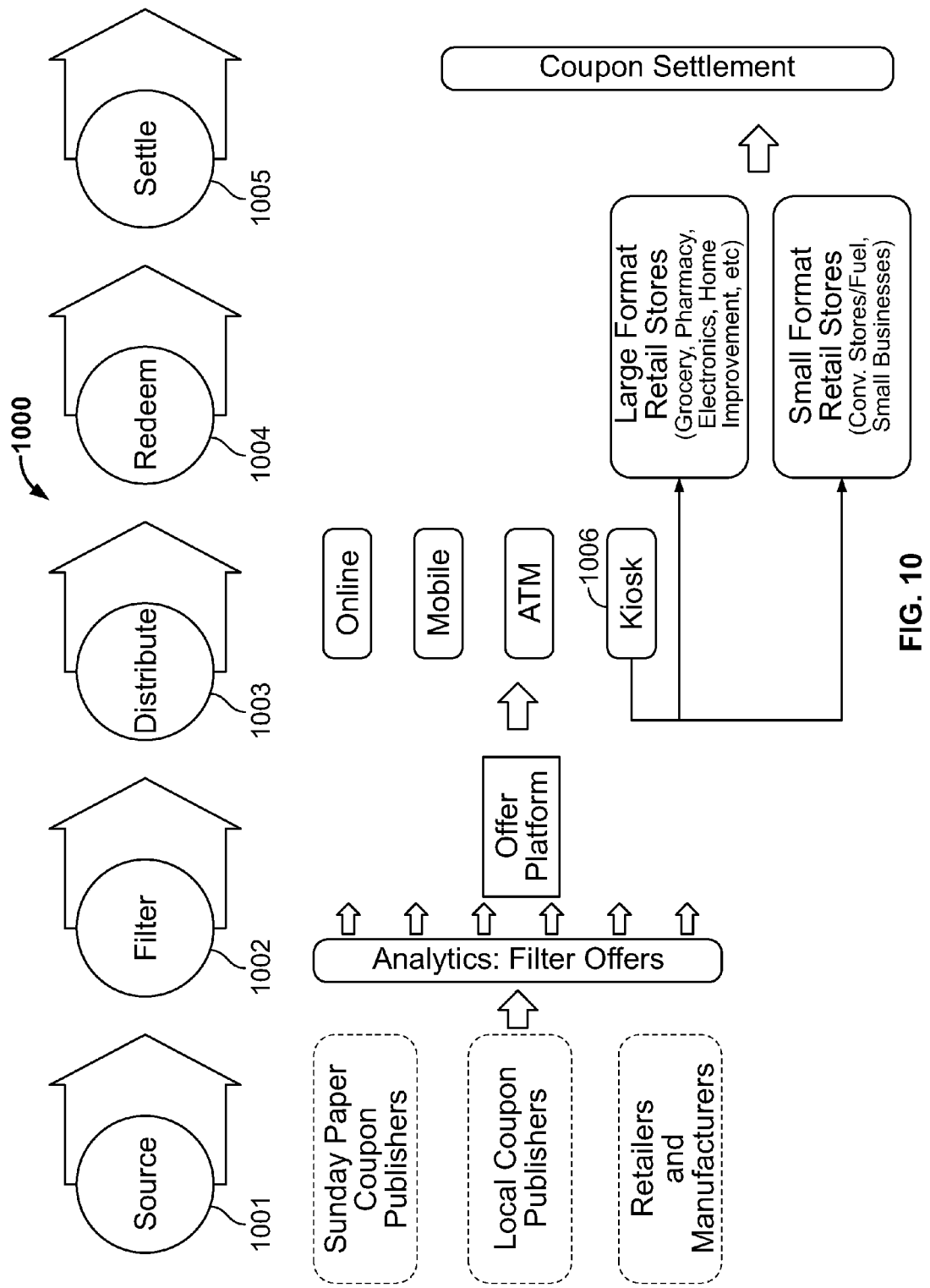
FIG. 10 is a flow diagram that corresponds to a portion of the process shown in FIG. 9.

FIG. 10 shows illustrative process 1000 outlining the process of distributing and applying customer benefit offers. Process 1000 may correspond in whole or in part to a portion of the process shown in FIG. 9. In process 1000, the customer benefit offer is a coupon offer.

Step 1001 shows three illustrative sources for coupon offers. At step 1002, the coupon offers are filtered based on stored customer data and are stored on an offer platform. At step 1003, the coupon offers are distributed to the customer.

Process 1000 shows four illustrative communication methods. At step 1004, the coupons are applied at a point of sale. At step 1005, the redeemed coupons are processed for settlement.

Kiosk 1006 may be in or near merchant m's facility, in any location that is convenient for customer C or in any other suitable location. Customer C may use a purchasing instrument to communicate with kiosk 1006. For example, customer C may enroll in an offer program by providing customer identification information to kiosk 1006. An offer processor such as 202 may provide customer C with offer information via kiosk 1006.

Figure 11:
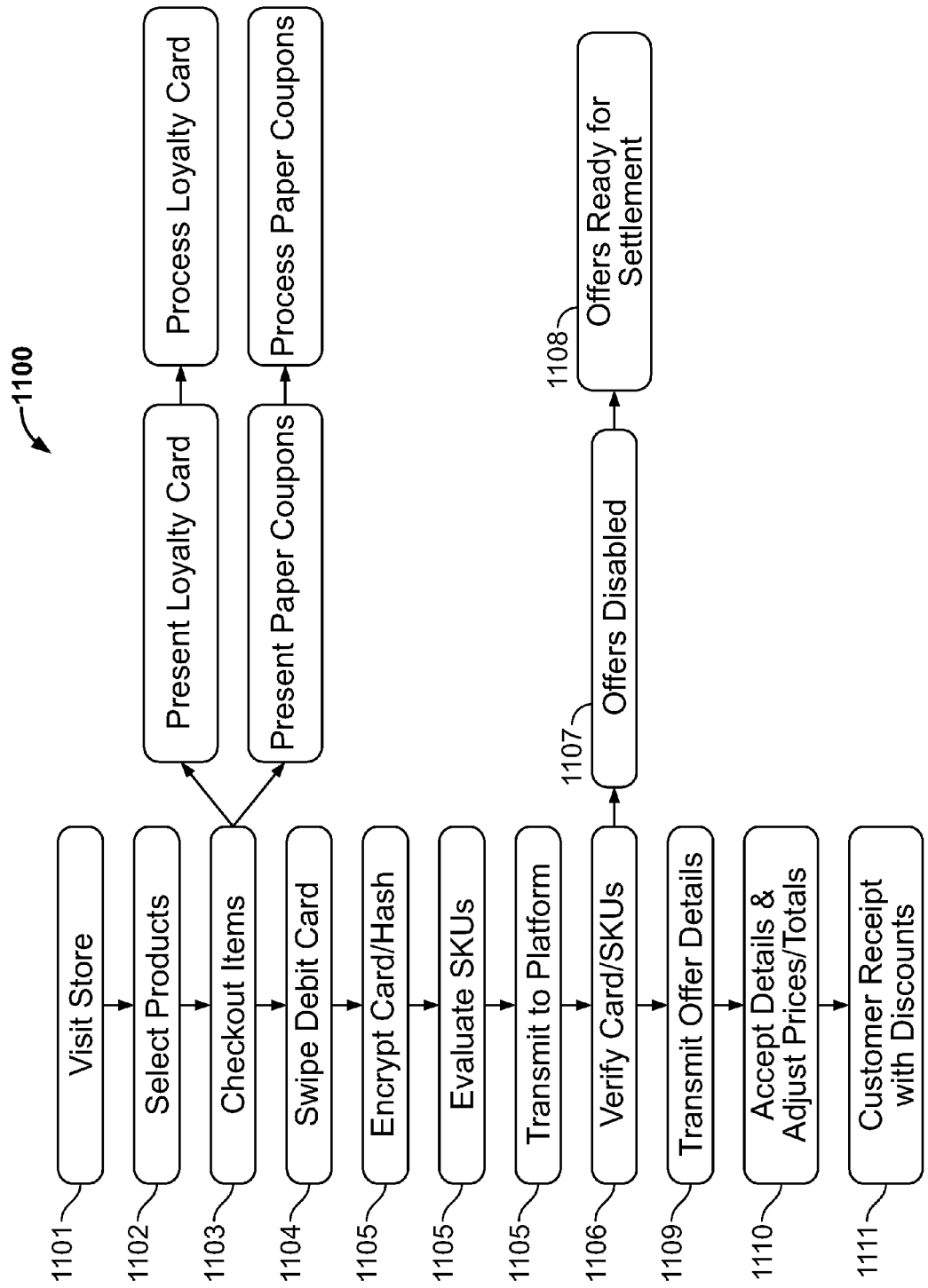
FIG. 11 is another flow diagram that corresponds to a portion of the process shown in FIG. 9.

FIG. 11 shows illustrative process 1100 outlining a purchase at a point of sale where customer benefits are applied. In process 1100, the purchasing instrument is a debit card and the customer benefit is an electronic coupon. Process 1100 may correspond in whole or in part to a portion of the process illustrated in FIG. 9.

At step 1101, the customer visits a participating retailer. At step 1102 the customer selects products for purchase. At step 1103, the products are checked out. Paper coupons and any store loyalty card may be processed and any discounts applied. At step 1104, the customer may swipe a debit card for payment. At step 1105, the encrypted debit card information and the product SKUs are transmitted to the integrated electronic platform storing pre-selected coupons.

At step 1106, the card information and the product SKUs are verified. In a sub-process, coupons are discharged and ready for settlement. At step 1107, coupon offers for the products purchased are disabled. At step 1108, the disabled offers are ready for settlement.

The primary process continues at step 1109. At step 1109, the details from coupon offers for the purchased products are transmitted to the retailer. At step 1110, the retailer accepts the details of the discount and adjusts prices or totals for the items purchased. At step 1111, the customer is provided with a receipt showing the discounts attributable to the electronic coupons.

Figure 12:
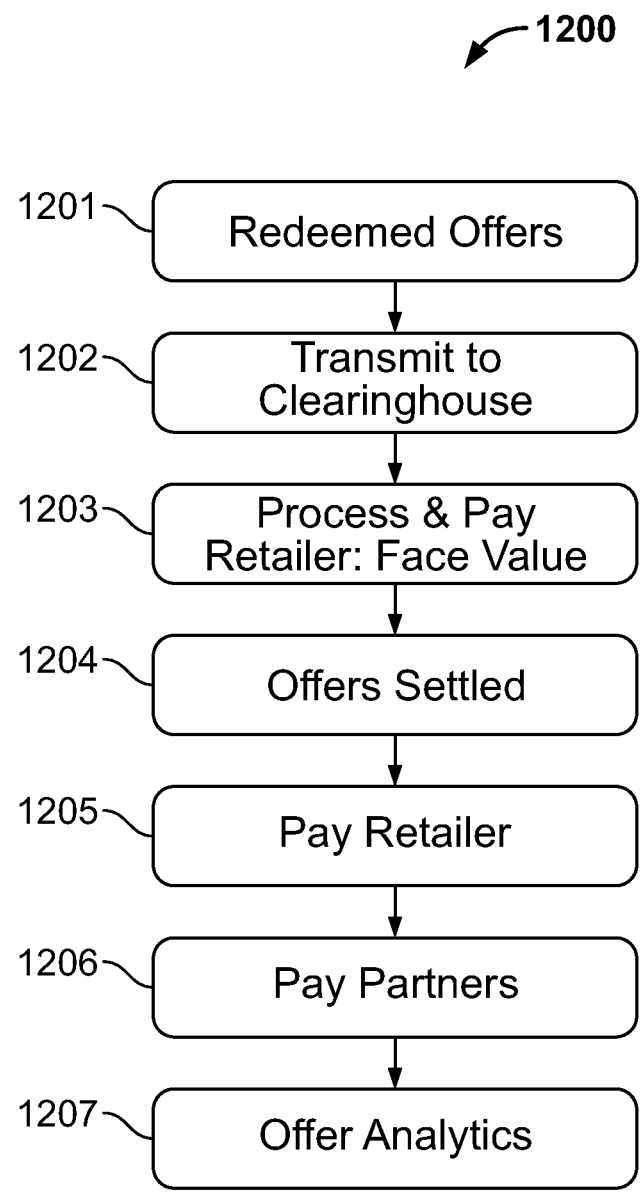
FIG. 12 is another flow diagram that corresponds to a portion of the process shown in FIG. 9.

FIG. 12 shows illustrative process 1200 for the settlement of redeemed electronic coupons. At step 1201 redeemed coupon offers stored on the electronic platform are ready for settlement. At step 1202, the redeemed offer data is transmitted to a clearinghouse. At step 1203, the coupons are processed and the payment for retailers is allocated. Retailers will be reimbursed for the face value of the coupons. At step 1204, the offers are settled. At step 1205, payment is transmitted from the electronic platform to the retailers. At step 1206, payment is transmitted to partners participating in providing the coupon offers. At step 1207, redemption data is transmitted to offer analytics and stored on the platform for use in directing future coupon offers to the customer.

Figure 13:
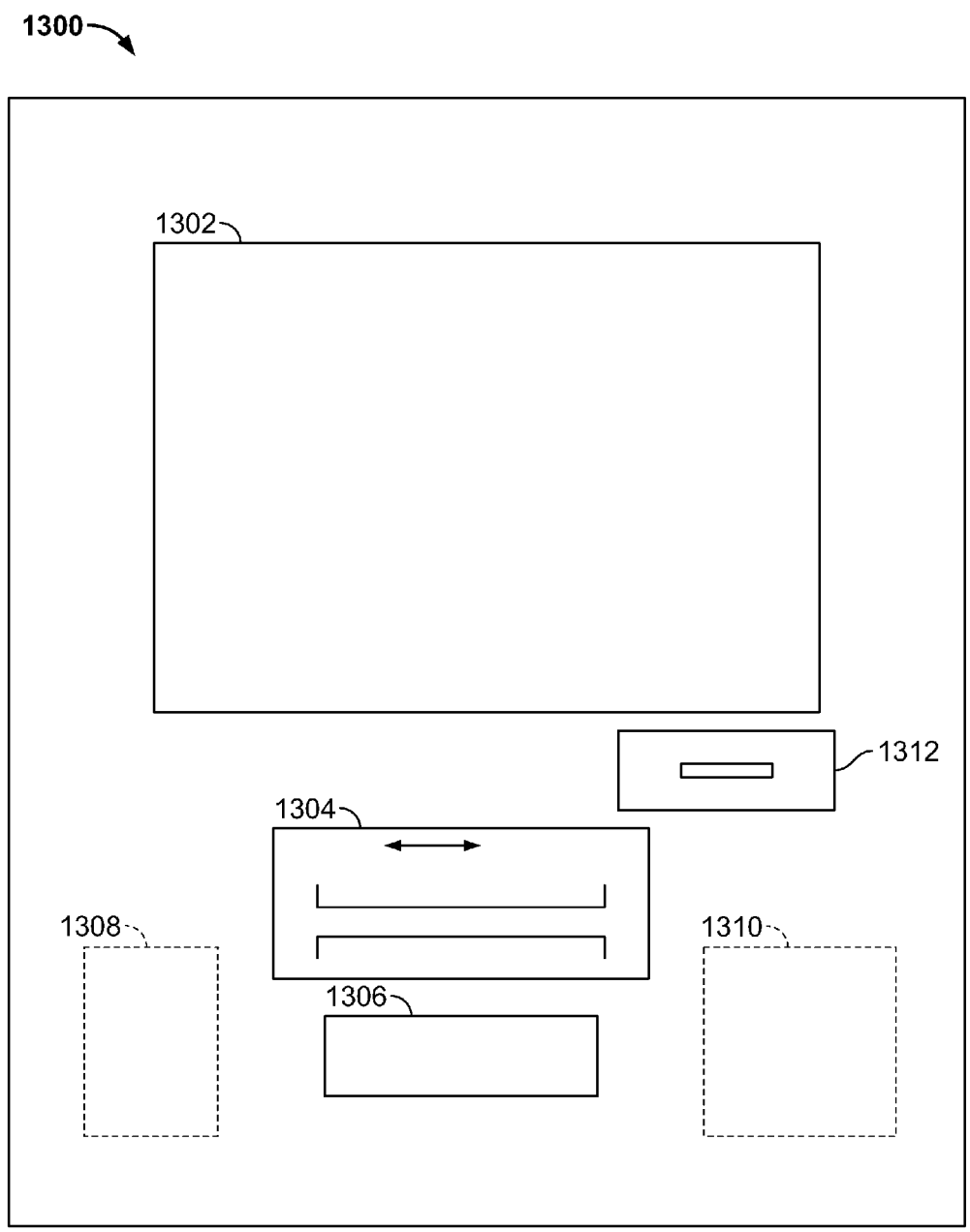
FIG. 13 shows still other apparatus in accordance with the principles of the invention.

FIG. 13 shows illustrative kiosk 1300. Kiosk 1300 may be a kiosk that performs tasks in connection with enrollment of customers in an offer program, distribution of offer information to customers and any other suitable tasks. Kiosk 1300 may placed in a location that is convenient for customers to use before or during shopping activities in connection with merchant M. Kiosk 1300 may perform one or more of the tasks associated with step 806 (shown in FIG. 800), one or more of the tasks associated with kiosk 1006 (shown in FIG. 10) or any other suitable tasks. In particular, kiosk 1300 may be used to allow a customer to instantly enroll in an offer program or to view, print or download customer benefit information so that a customer can receive benefits, including discounts, in connection with purchases from merchant M.

Kiosk 1300 may include one or more of the features of the devices shown in FIG. 3. Kiosk 1300 may include touch screen display 1302 for displaying instructions, offer information and any other suitable information to customer C. Kiosk 1300 may include printer 1312 for printing customer benefit, offer, and other suitable information. Kiosk 1300 may include card reader 1304 for reading a swipable purchasing instrument, such as a credit or debit card. Kiosk 1300 may include near field communication module 1306 for communicating with an NFC-equipped purchasing instrument such as a cellular telephone. Kiosk 1300 may include processor 1308 for encoding data from the purchasing instrument. Kiosk 1300 may include communications module 1310 for exchanging the encoded data via an electronic communication network with an offer processor such as 202 (shown in FIG. 2).

In some embodiments, some or all of the functions of kiosk 1300 may be present in a self-service device, such as an automatic teller machine ("ATM"), a ticket- or token-vending machine or an information dispensing machine (such as are found in public transportation stations, such as train and bus stations and airports).

Figure 14:
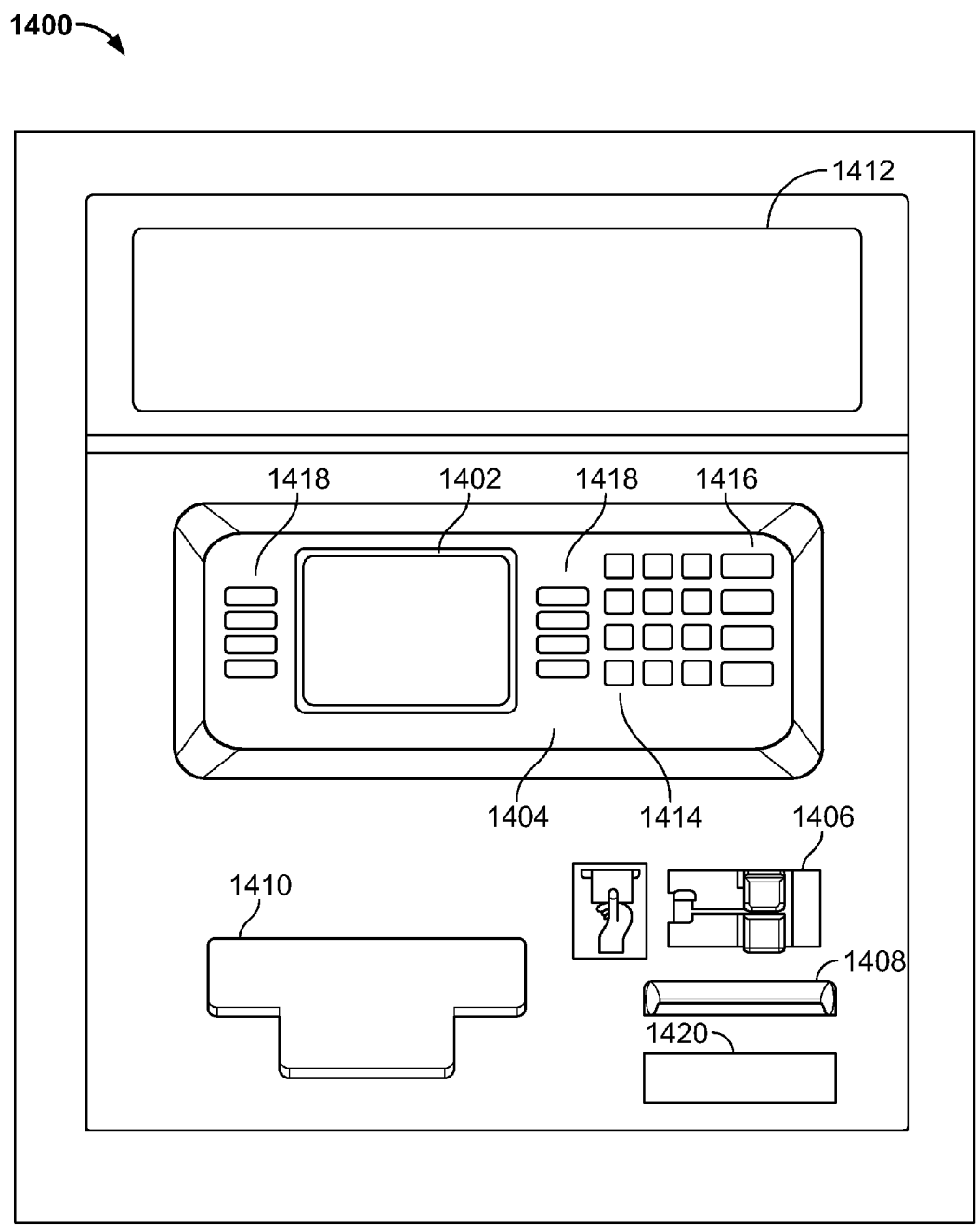
FIG. 14 shows still other apparatus in accordance with the principles of the invention.

FIG. 14 shows illustrative self-service device 1400, which may be an ATM. Self-service device 1400 may include monitor 1402, keypad 1404, card reader port 1406, document acceptor 1408, item dispenser 1410 and security screen 1412.

Monitor 1402 may exchange visual and or audio information with a customer. Keypad 1404 may include alphanumeric keys 1414 for the customer to enter numerical and textual data. Keypad 1404 may include control keys 1416. In some embodiments, control keys 1416 may be used to communicate control information, such as instructions, to self-service device 1400. Keypad 1404 may include soft keys. Soft keys 1418 may have functions that are dictated by programming and are presented to the customer using information that may be displayed on monitor 1402.

Card reader port 1406 may be the front end of any suitable card reader. The card reader may read magnetically encoded information on transaction instruments such as bank cards. In some embodiments, self-service device 1400 may include a contactless chip reader such as NFC module 1420, a wireless transceiver or any other suitable interface for exchanging transaction information with a transaction instrument. The transaction instrument may be a chip, an RFID tag, a smart card, a PDA, a telephone or any other suitable device.

In some embodiments, self-service device 1400 may include a biometric sensor (not shown). The biometric sensor may identify a customer based on a feature, such as an anatomical feature, of the customer. For example, the biometric sensor may be configured to identify the customer based on all or part of a face, a fingerprint, an iris, a retina a hand or any other suitable anatomical feature. The biometric sensor may identify the customer based on a behavioral feature such as a signature, a voice, a gait or any other suitable behavioral feature.

Document acceptor 1408 may accept any suitable documents. For example, document acceptor 1408 may accept envelopes, deposit forms, bills, checks or any other suitable documents. In some embodiments, document acceptor 1408 may feed into a scanner that digitizes the documents for image-based transaction processing.

Item dispenser 1410 may dispense items. For example, item dispenser 1410 may dispense bills.

Security screen 1412 may visually screen a surveillance device (not shown). The surveillance device may provide video information about individuals that are present near the self-service device and the conditions there.

Figure 15:
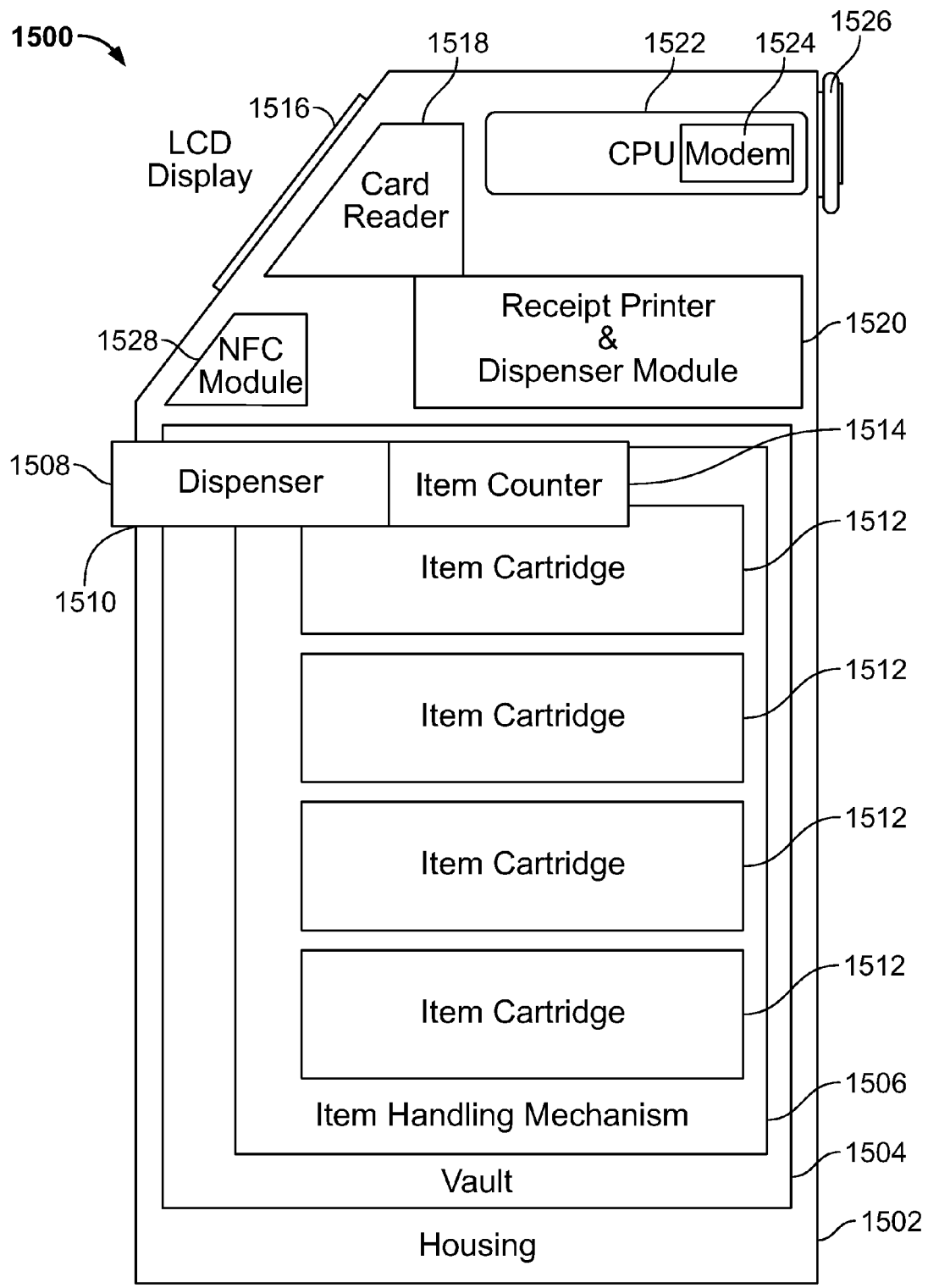
FIG. 15 shows still other apparatus in accordance with the principles of the invention.

FIG. 15 shows illustrative self-service device 1500. Self-service device 1500 may have one or more of the features of self-service device 200 (shown in FIG. 2). Self-service device 1500 may include housing 1502. Self-service device 1500 may include vault 1504. Vault 1504 may contain items (not shown). Item handling mechanism 1506 may be present in vault 1504. Item handling mechanism 1506 may store, arrange, dispense and/or otherwise handle items for dispensing from self-service device 1400. For example, item handling mechanism 1506 may include conveyors (not shown) for positioning and repositioning items for dispensing by dispenser 1508 through item port 1510. Items (not shown) in item handling mechanism 1506 may be contained in item cartridges 1512. For example, when the items are bills, item cartridges 1512 may be cash cartridges.

Item handling mechanism 1506 may include item counter 1514. Item counter 1514 may count items prior to dispensing by dispenser 1508.

Self-service device 1500 may include LCD display 1516 and a keypad (not shown) for customer interaction. Card reader 1518 may be present for receiving transaction information from the customer via a suitable transaction instrument. Self-service device 1500 may include receipt printer and dispenser module 1520. Receipt printer and dispenser module 1520 may provide the customer with a record of a transaction. CPU 1520 may control customer I/O, dispensing processes, which may include initialization, actuation, dispensing and any other suitable processes, receipt printing and dispensing, transaction channel communications and any other suitable processes. The transaction channel communications may be performed using modem 1524, which may be any suitable communication device. Modem 1524 may communicate with a local or regional network router (not shown). Service monitor 1526 may be provided for a service technician to exchange information and instructions with CPU 1522.

Figure 16:
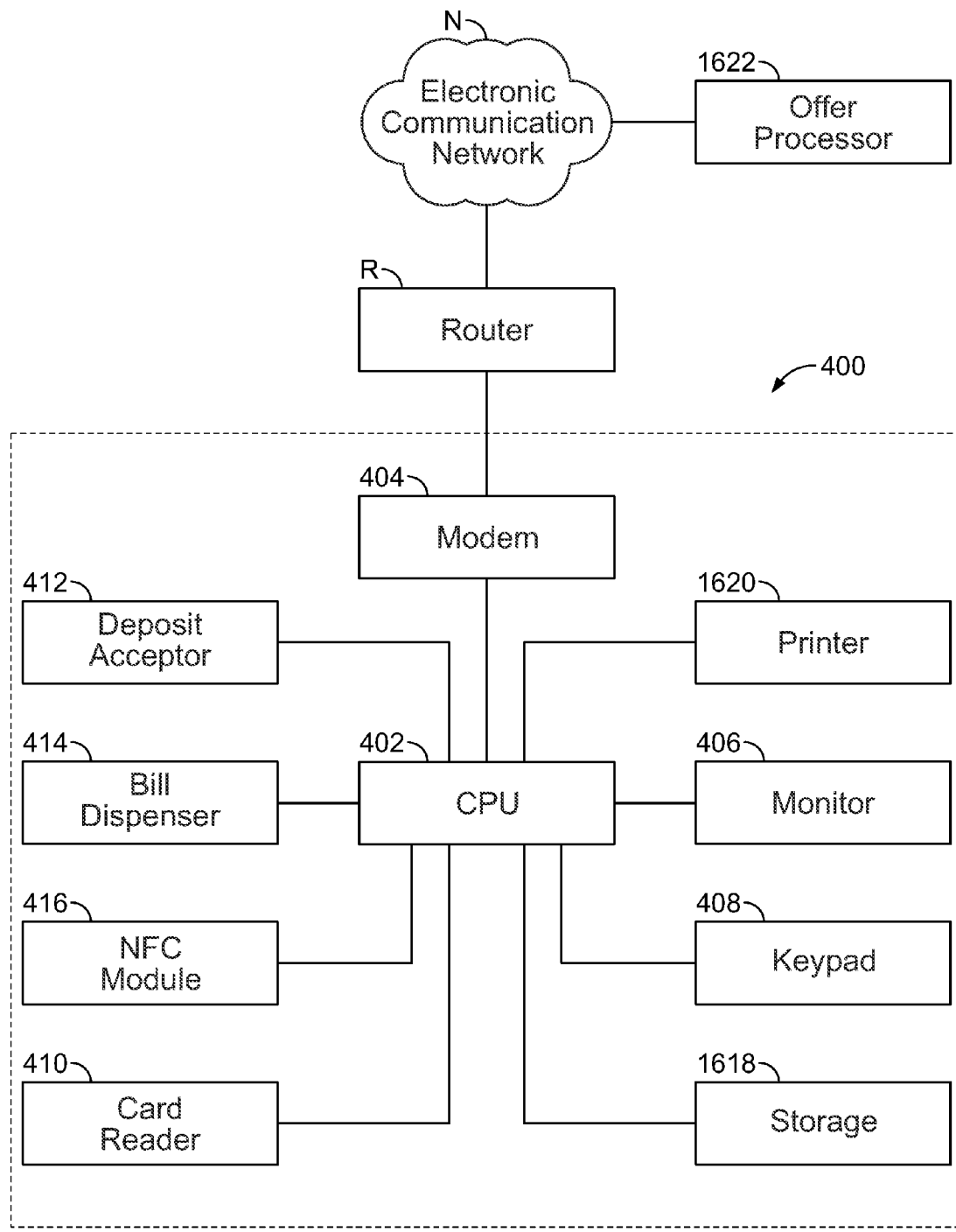
FIG. 16 shows still other apparatus in accordance with the principles of the invention.

FIG. 16 shows control system 1600 for controlling a self-service device such as 1500 (shown in FIG. 15). System 1600 is controlled by CPU 1602. CPU 1602 exchanges transaction information with electronic communication network N via modem 1604, which is in communication with router R. CPU 1602 may receive transaction information from a customer via monitor 1606, keypad 1608, card reader 1610, NFC module 1616, storage 1618 and deposit acceptor 1612. CPU 1602 may dispense bills through bill dispenser 1614. Offer information may be provided to customer C via monitor 1606 and/or printer 1620. Design and layout information may be stored in storage 1618. The design and layout information may be provided to printer 1620 to provide printed media with graphic illustrations. For example, when the offer information includes a coupon, the coupon may be provided with graphic illustrations and/or patterns.

CPU 1602 may be configured to use monitor 1606 to prompt customer C to inquire about offer information that is related to merchant M's goods. For example, merchant M may be set as a default merchant in memory 1618 when ATM 1400 is located at, near or in association with merchant M's facility. In some embodiments, CPU 1602 may prompt customer C to select a merchant about whose offers customer C desires to inquire. CPU 1602 may receive customer information from a mobile wallet or card via card reader 410 or NFC module 416. CPU 1602 may encode or hash some or all of the customer information. CPU 1602 may provide the coded customer information to offer processor 1622. Offer processor 1622 may have some or all of the features of offer processor 202 (shown in FIG. 2). Offer processor 1602 may return customer benefit, offer and other suitable information to CPU 1602. The customer benefit, offer and other suitable information may be displayed by monitor 1606 and/or printed on printer 1620.

FIGS. 17-25 show illustrative views for display to customer C at a kiosk such as 1300 (shown in FIG. 13). Some customer-interactive aspects of views 17-25 involve the use of swipable cards. It will be understood that swipable cards are discussed as an example of a purchasing instrument and that any suitable purchasing instrument may be used.

FIGS. 17-20 may be displayed on the kiosk to offer customer C an opportunity to view offers to which customer C may be entitled and to enroll in an offer program (identified as an "e-discount" program in view 1700).

Figures 17, 18:
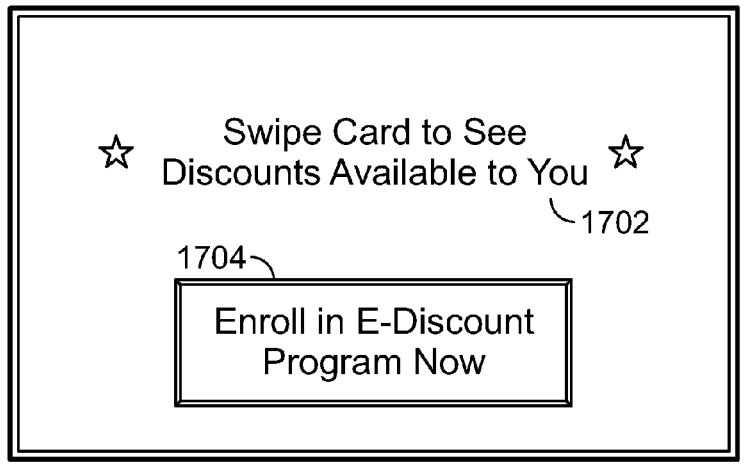
FIG. 17 shows still other apparatus in accordance with the principles of the invention.
FIG. 18 shows still other apparatus in accordance with the principles of the invention.

FIG. 17 shows illustrative view 1700. View 1700 may include text 1702 that invites customer C to have customer C's card read. The kiosk may then identify offers available to C by communicating with an offer processor such as 202 (shown in FIG. 2). The kiosk may display textual, graphical or audio representations (not shown) of the offers. The kiosk may provide customer C with an opportunity to request a print-out of the offers. In some embodiments, the kiosk may print out the offers in response to a card swipe or the detection of a purchasing instrument NFC signal.

View 1700 may include touch-screen control 1704 that invites customer C to enroll in an offer program such as that shown in and described in connection with FIG. 8.

FIG. 18 shows illustrative view 1800. The kiosk may display view 1800 in response to a card swipe by customer C. View 1800 shows customer benefit information 1802, which may be associated with customer C. Customer benefit information 1802 may include for each customer benefit 1804 quantity 1806, item identifier 1808, regular price 1810, discounted price 1812 and location in store ("AISLE") 1814. Any other suitable information may be included.

Figure 19:
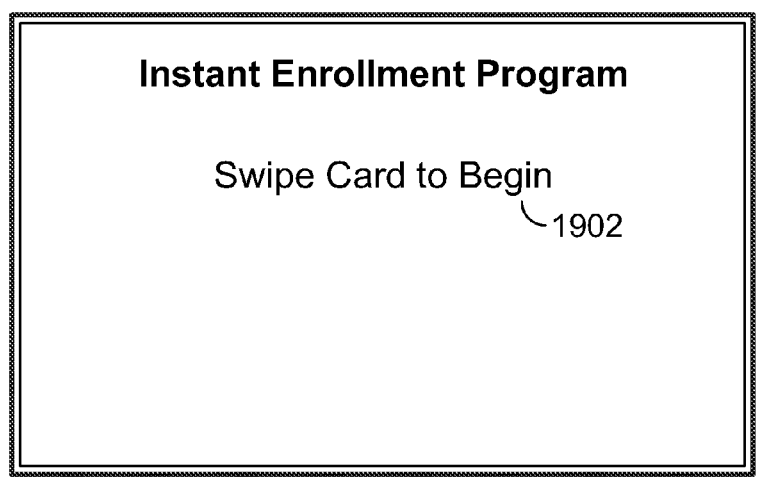
FIG. 19 shows still other apparatus in accordance with the principles of the invention.

FIG. 19 shows illustrative view 1900. The kiosk may display view 1900 in response to customer C's activation of control 1704 (shown in FIG. 17). Text 1902 may instruct customer C to swipe a card to initiate an enrollment process such as that including illustrative steps 807-809 (shown in FIG. 8).

Figure 20:
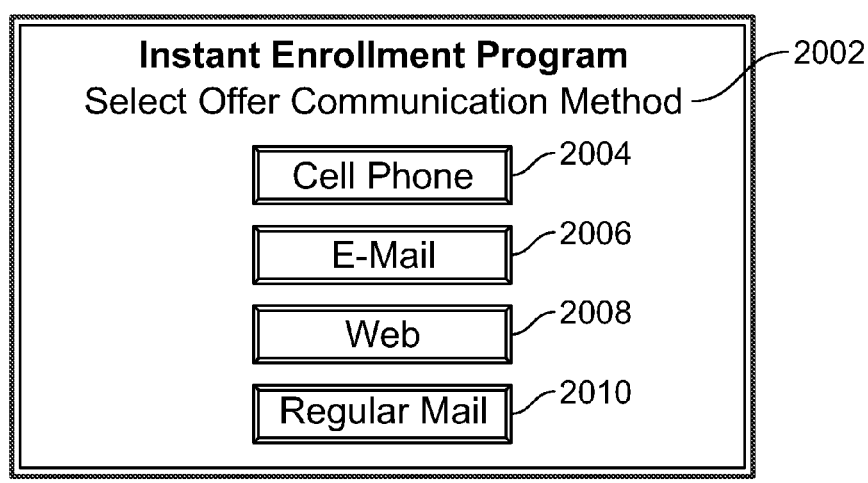
FIG. 20 shows still other apparatus in accordance with the principles of the invention.

FIG. 20 shows illustrative view 2000. The kiosk may display view 2000 in connection with a step such as 808 (shown in FIG. 8) in which an offer communication method is selected. View 2000 may include instruction 2002 that requests that customer C select an offer communication method. View 2000 may include controls 2004, 2006, 2008 and 2010, which correspond to selections of communication by cell phone, e-mail, web and regular mail, respectively.

FIGS. 21-25 show illustrative views that may be displayed by a POS terminal such as 408 (shown in FIG. 4), which may be associated with a merchant such as M (shown in FIG. 2).

Figure 21:
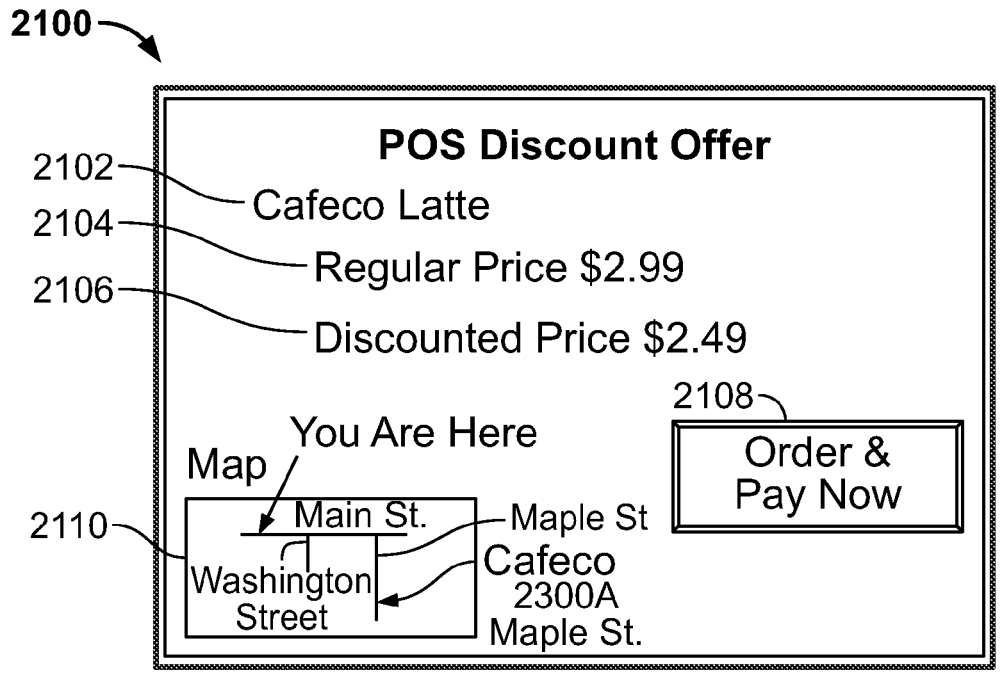
FIG. 21 shows still other apparatus in accordance with the principles of the invention.

FIG. 21 shows illustrative view 2100. View 2100 may be displayed by the POS terminal to offer customer C supplemental goods that customer C may pay for as part of the transaction with merchant M. The supplemental goods may be offered or sold by merchant M or a third party. The third party may be an offer source such as one of offer sources 204. The offer source may provide to the offer agent promotional information that is to be displayed or performed on or by a POS terminal at merchant M's facility. The promotional information may include text, images, audio, video and any other suitable type of information.

The third party may arrange with an offer agent such as 201 (shown in FIG. 2) to purchase promotional opportunities on merchant M's POS terminals to promote and sell a product. Merchant M collects payment for the product and is reimbursed by the third party. Merchant M may "invoice" the third party through agent 201 (shown in FIG. 2).

View 2100 may include item identifier 2102, item regular price 2104, item discounted price 2106, control 2108 and map 2110. Customer C may activate control 2108 to accept the offer of supplemental goods. If customer C accepts the offer of supplemental goods, the POS terminal may add the price of the supplemental goods to customer C's payable amount. The POS terminal may provide a printed voucher for the supplemental goods. In some embodiments, the POS terminal may instruct the offer agent to instruct the third party to prepare the supplemental goods for pick-up at a designated time. The POS terminal may print a copy of map 2110.

FIGS. 22-25 show illustrative views that may be displayed by a POS terminal such as 408 (shown in FIG. 4), which may be associated with a merchant such as M (shown in FIG. 2). The views relate to an offer of instant credit to pay merchant M for the purchase of goods by customer C. The credit may be provided by merchant M or a third party. The third party may be a bank, a financial institution or any other suitable third party. The third party may be an offer source such as one of offer sources 204. The third party may arrange with an offer agent such as 201 (shown in FIG. 2) to purchase opportunities on merchant M's POS terminals to offer its credit. Merchant M receives payment for the product from the third party.

Figure 22:
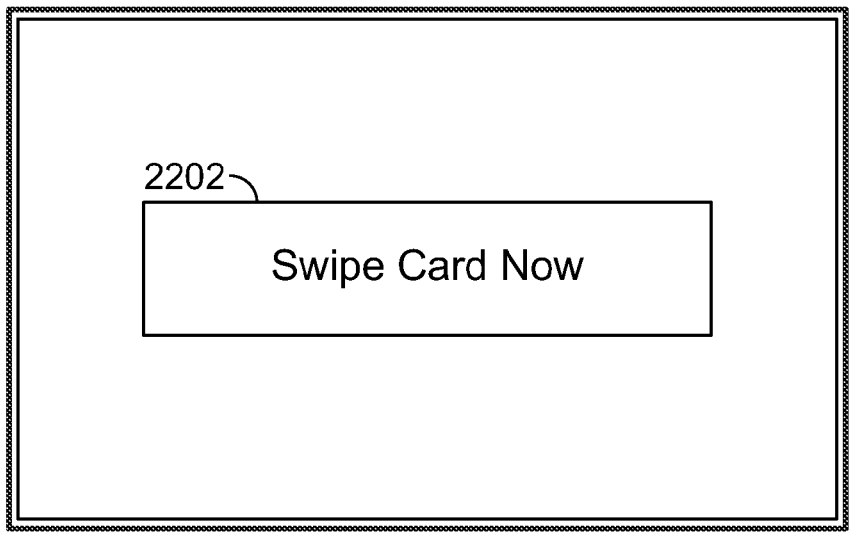
FIG. 22 shows still other apparatus in accordance with the principles of the invention.

FIG. 22 shows illustrative view 2200. View 2200 may include instruction 2202, which may instruct customer C to swipe a card. The POS terminal may receive information identifying the customer from the card.

Figure 23:
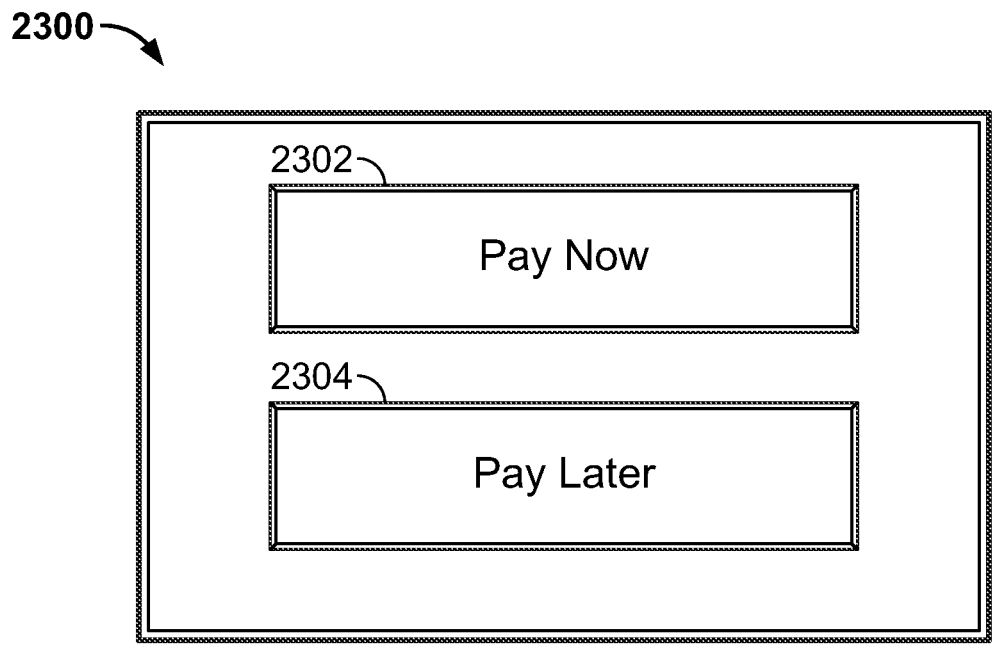
FIG. 23 shows still other apparatus in accordance with the principles of the invention.

FIG. 23 shows illustrative view 2300. View 2300 may include "Pay Now" control 2302. View 2300 may include "Pay Later" control 2304. If customer C activates "Pay Now" control 2302, the POS terminal may initiate a normal purchase transaction.

If customer C activates "Pay Later" control 2304, the POS terminal may initiate an instant credit application. In an illustrative instant credit application process, the POS terminal may provide the identification information (in hashed form, e.g.), along with transaction information such as a purchase amount, to the offer agent, which may route the identification to the third party or an agent, such as an authorization/clearance agent (like that shown in FIG. 1) for credit and risk decisioning. In embodiments in which the POS terminal is based on internet protocols, the identification information may be routed directly to the third party or the agent.

Figure 24:
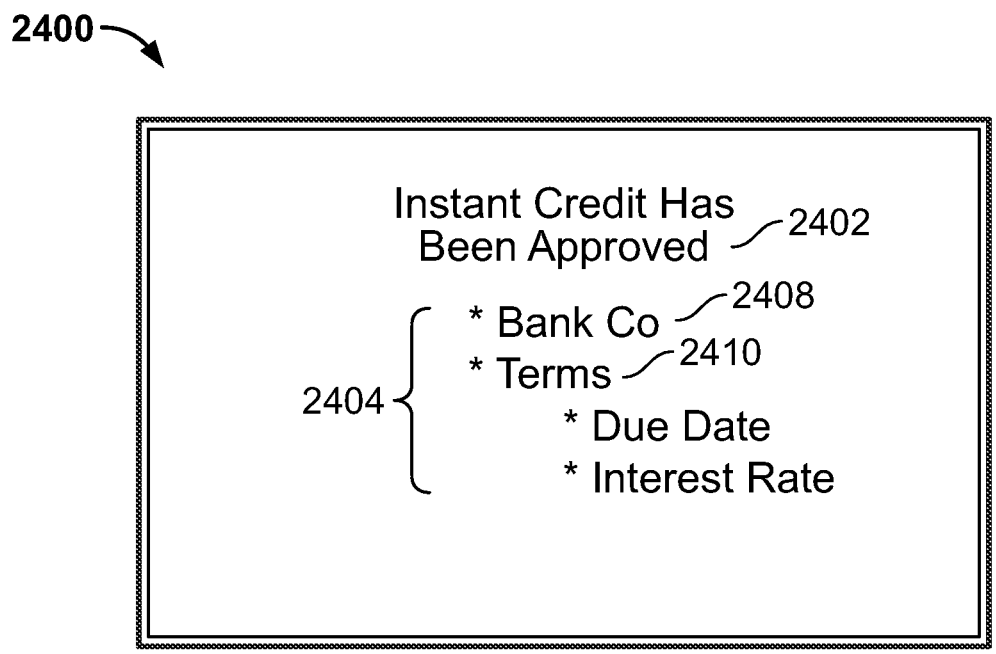
FIG. 24 shows still other apparatus in accordance with the principles of the invention.

FIG. 24 shows illustrative view 2400. View 2400 may include application decision information 2402. In this view, application decision information 2402 informs customer C that customer C's credit application was approved. View 2400 may include credit information 2404. Credit information 2404 may include lending institution information 2408 and credit terms information 2410. Credit terms information 2410 may include a due date, an interest rate and other suitable information. The POS terminal may provide customer C with other views (not shown) that include legal terms of the credit and interactive controls for customer C to accept or reject the terms.

Figure 25:
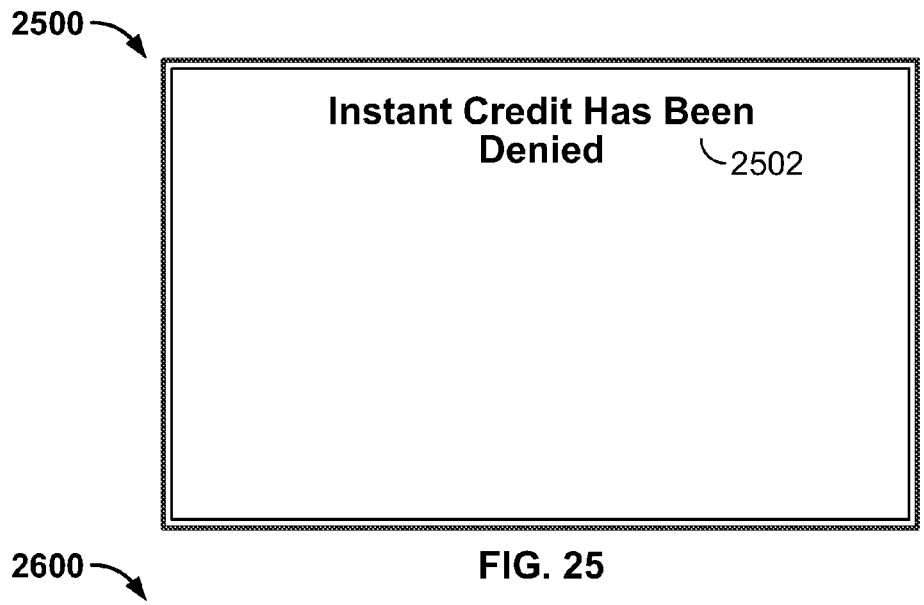
FIG. 25 shows still other apparatus in accordance with the principles of the invention.

FIG. 25 shows illustrative view 2500. View 2500 may include application decision information 2502. In this view, application decision information 2502 informs customer C that customer C's credit application was denied. The POS terminal then may initiate a normal purchase transaction.

Figure 26:
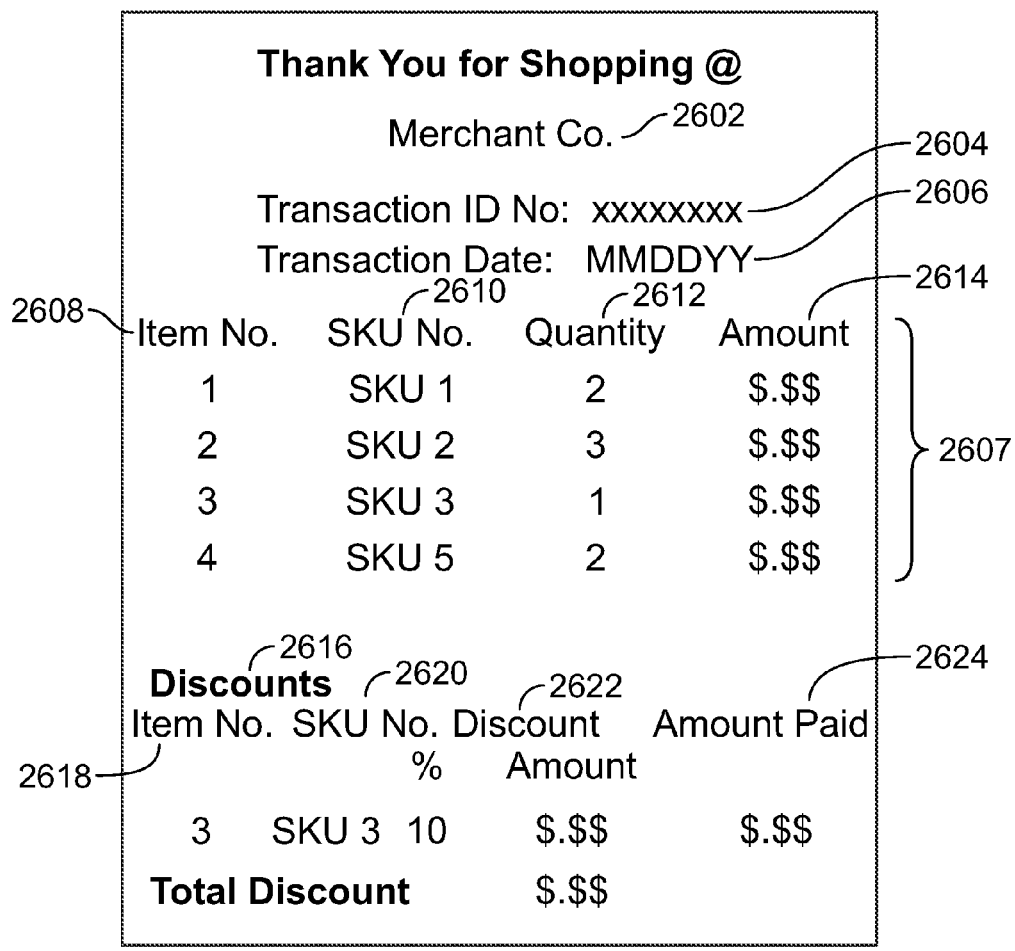
FIG. 26 shows still other apparatus in accordance with the principles of the invention.

FIG. 26 shows illustrative record 2600. Record 2600 may be a printed document, such as a transaction receipt, an electronic message (which may be in any suitable format such as HTML, SMS text, image or any other suitable format) or any other suitable type of document. Record 2600 may be printed out by the POS terminal or an associated printer. Record 2600 may be transmitted to customer C by email, near field communication, cell phone or any other suitable method.

View 2600 may include itemized purchase information 2607. Itemized purchase information 2607 may list items that are the subject of a transaction between merchant M and customer C. Itemized purchase information 2607 may include merchant identification information 2602, transaction identification information 2604, date information 2606, item index information 2608, stock identification information 2610, quantity information 2612, amount information 2614 and other suitable itemized purchase information.

View 2600 may include itemized discount information 2616. Itemized discount information may list items for which customer C received a discount. The discount may be based on apparatus and methods shown and described herein. View 2616 may include item index information 2618, stock identification information 2620, discount information 2622, amount paid information 2624 and other suitable itemized purchase information. Discount information 2622 may include discounts represented as a percentage and as an amount.

Thus, apparatus and methods for electronically distributing customer benefit offers are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for enrolling a purchasing instrument in an electronic platform, the electronic platform for association of the purchasing instrument with customer benefit offers and store loyalty program discounts, the method comprising:

using an electromagnetic receiver module, receiving data from the purchasing instrument, the data comprising information associated with a credit card or debit card;

using the electromagnetic receiver module, receiving a customer selection of a notification channel from a customer, the channel to be used for notifying the customer about a plurality of customer benefit offers and a plurality of store loyalty program discounts;

using the electromagnetic receiver, receiving store loyalty program information that identifies the customer and that identifies a store loyalty program in which the customer participates;

using a processor module, associating the store loyalty program information with an account on the electronic platform, said account associated with a plurality of customer benefit offers and store loyalty program discounts stored on the platform; and using the processor module, associating the purchasing instrument data with the account such that the plurality of customer benefit offers and store loyalty program discounts that are stored on the platform are associated with the purchasing instrument, said store loyalty program discounts otherwise available to customers participating in the store loyalty program upon presentation of a store loyalty program card at a point of sale, wherein use of the purchasing instrument at a point of sale triggers application of the associated customer benefit offers and store loyalty program discounts, and replaces presentation of a store loyalty program card.

2. The method of claim 1 wherein the receiving data from the purchasing instrument comprises receiving data via a web interface provided by the issuer of the purchasing instrument.

3. The method of claim 1 wherein receiving data from the purchasing instrument comprises using a card reader to read the data from a purchasing instrument magnetic strip.

4. The method of claim 1 wherein receiving data from the purchasing instrument comprises using an automated teller machine card reader to read the data from a purchasing instrument magnetic strip.

5. The method of claim 1 further comprising, using the electromagnetic receiver module, receiving a selection of an alternate notification channel, the alternate notification channel to be used for notifying the customer about a plurality of customer benefit offers and a plurality of store loyalty program discounts, the customer benefit offers and store loyalty program discounts being redeemable in connection with the purchase of goods at a point of sale terminal.

6. The method of claim 1 wherein receiving data from the purchasing instrument comprises using a point of sale terminal card reader to read the data from a purchasing instrument magnetic strip.

7. A computer usable medium having computer readable program code embodied therein, said computer readable program code adapted to be executed to implement a method for enrolling a purchasing instrument in an electronic platform, the electronic platform for association of the purchasing instrument with customer benefit offers and store loyalty program discounts, the method comprising:
receiving data from the purchasing instrument, the data comprising information associated with a credit card or debit card;
receiving a customer selection of a notification channel from a customer, the channel to be used for notifying the customer about a plurality of customer benefit offers and a plurality of store loyalty program discounts;
receiving store loyalty program information that identifies the customer and that identifies a store loyalty program in which the customer participates;
using a processor module, associating the store loyalty program information with an account on the electronic platform, said account associated with a plurality of customer benefit offers and store loyalty program discounts stored on the platform; and
using the processor module, associating the purchasing instrument data with the account such that the plurality of customer benefit offers and store loyalty program discounts that are stored on the platform are associated with the purchasing instrument, said store loyalty program discounts, in the absence of the method according to the invention, available to customers participating in the store loyalty program upon presentation of a store loyalty program card at a point of sale, wherein use of the purchasing instrument at a point of sale triggers application of the associated customer benefit offers and store loyalty program discounts, and replaces presentation of a store loyalty program card.

8. The medium of claim 7 wherein, in the method, the receiving data from the purchasing instrument comprises receiving data via a web interface provided by the issuer of the purchasing instrument.

9. The medium of claim 7 wherein, in the method, the receiving data from the purchasing instrument comprises using a card reader to read the data from a purchasing instrument magnetic strip.

10. The medium of claim 7 wherein, in the method, the receiving data from the purchasing instrument comprises using an automated teller machine card reader to read the data from a purchasing instrument magnetic strip.

11. The medium of claim 7 wherein the method further comprises receiving a selection of an alternate notification channel, the alternate notification channel to be used for notifying the customer about a plurality of customer benefit offers and a plurality of store loyalty program discounts, the customer benefit offers and store loyalty program discounts being redeemable in connection with the purchase of goods at a point of sale terminal.

12. The medium of claim 7 wherein, in the method, the receiving data from the purchasing instrument comprises using a point of sale terminal card reader to read the data from a purchasing instrument magnetic strip.

13. A system for enrolling a purchasing instrument in an electronic platform, the electronic platform for association of the purchasing instrument with customer benefit offers and store loyalty program discounts, the system comprising:
an electromagnetic receiver module configured to:
receive data from the purchasing instrument, the data comprising information associated with a credit card or debit card;
receive a customer selection of a notification channel from a customer, the channel to be used for notifying the customer about a plurality of customer benefit offers and a plurality of store loyalty program discounts; and
receive store loyalty program information that identifies the customer and that identifies a store loyalty program in which the customer participates; and
a processor module configured to:
associate the store loyalty program information with an account on the electronic platform, said account associated with a plurality of customer benefit offers and store loyalty program discounts stored on the platform; and
associate the purchasing instrument data with the account such that the plurality of customer benefit offers and store loyalty program discounts that are stored on the platform are associated with the purchasing instrument, said store loyalty program discounts otherwise available to customers participating in the store loyalty program upon presentation of a store loyalty program card at a point of sale, wherein use of the purchasing instrument at a point of sale triggers application of the associated customer benefit offers and store loyalty program discounts, and replaces presentation of a store loyalty program card.

14. The system of claim 13 wherein the receiver module is further configured to receive data via a web interface provided by the issuer of the purchasing instrument.

15. The system of claim 13 further comprising, when the purchasing instrument has a magnetic data strip, a card reader that is configured to read data from the magnetic data strip.

16. The system of claim 13 wherein the receiver module is further configured to receive a selection of an alternate notification channel, the alternate notification channel to be used for notifying the customer about a plurality of customer benefit offers and a plurality of store loyalty program discounts, the customer benefit offers and store loyalty program discounts being redeemable in connection with the purchase of goods at a point of sale terminal.

17. The system of claim 13 further comprising, when the purchasing instrument has a magnetic data strip, a point of sale terminal card reader that is configured to read data from the magnetic data strip.

* * * * *